United States Patent
Iizuka et al.

(10) Patent No.: US 10,305,754 B2
(45) Date of Patent: May 28, 2019

(54) APPARATUS AND METHOD TO COLLECT PACKETS RELATED TO ABNORMAL CONNECTION

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 378 days.

(21) Appl. No.: 15/343,581

(22) Filed: Nov. 4, 2016

(65) Prior Publication Data
US 2017/0163499 A1   Jun. 8, 2017

(51) Int. Cl.
*H04L 12/26* (2006.01)
(52) U.S. Cl.
CPC ............ *H04L 43/04* (2013.01); *H04L 43/022* (2013.01); *H04L 43/08* (2013.01); *H04L 43/10* (2013.01)
(58) Field of Classification Search
CPC ......... H04L 43/04; H04L 43/08; H04L 43/10; H04L 43/022
See application file for complete search history.

(56) References Cited

U.S. PATENT DOCUMENTS

| | | | | |
|---|---|---|---|---|
| 6,222,844 B1* | 4/2001 | Han | ................... | H04Q 11/0478 370/397 |
| 9,516,053 B1* | 12/2016 | Muddu | ............... | H04L 63/1425 |
| 9,584,381 B1* | 2/2017 | Leone | ..................... | H04L 43/04 |
| 2006/0209699 A1 | 9/2006 | Tamura et al. | | |
| 2010/0185762 A1* | 7/2010 | Yasuie | ................ | H04L 41/0677 709/224 |
| 2012/0230208 A1* | 9/2012 | Pyatkovskiy | ........... | H04L 43/10 370/250 |
| 2013/0041934 A1* | 2/2013 | Annamalaisami | .... | H04L 43/026 709/203 |

(Continued)

FOREIGN PATENT DOCUMENTS

| | | |
|---|---|---|
| JP | 2006-261804 | 9/2006 |
| JP | 2015-95785 | 5/2015 |

(Continued)

*Primary Examiner* — Kostas J Katsikis
(74) *Attorney, Agent, or Firm* — Xsensus LLP

(57) ABSTRACT

An apparatus allocates a packet-identifier to each packet captured from a network, and stores the each packet in a buffer. The apparatus associates, with each of the packet-identifiers, a connection-identifier specifying a connection of a packet identified by the each packet-identifier, and detects a connection to which a primary abnormality is occurring by analyzing packets stored in the buffer. The apparatus stores, for each connection to which the primary abnormality has occurred, a primary-abnormality group of packets to which the packet-identifiers associated with the connection-identifier of the each connection are allocated, in a first storage-region, detects a connection to which a secondary abnormality is occurring, based on a statistical value related to results of analyses on packets captured in a sampling duration, and writes, in a second storage-region, packets related to connections to which the secondary abnormality has occurred, among the primary-abnormality groups stored in the first storage-region.

5 Claims, 26 Drawing Sheets

(56) References Cited

U.S. PATENT DOCUMENTS

| | | | |
|---|---|---|---|
| 2014/0304393 A1* | 10/2014 | Annamalaisami | H04L 43/04 709/224 |
| 2015/0074259 A1* | 3/2015 | Ansari | H04L 67/02 709/224 |
| 2015/0117242 A1* | 4/2015 | Ohkawa | H04L 43/08 370/252 |
| 2015/0131451 A1 | 5/2015 | Iizuka et al. | |
| 2015/0172225 A1 | 6/2015 | Iizuka et al. | |
| 2017/0155537 A1* | 6/2017 | Maheshwari | H04L 41/064 |
| 2017/0279685 A1* | 9/2017 | Mota | H04L 41/12 |
| 2017/0279694 A1* | 9/2017 | Sartran | H04L 43/08 |
| 2017/0279837 A1* | 9/2017 | Dasgupta | H04L 45/00 |
| 2017/0279847 A1* | 9/2017 | Dasgupta | H04L 63/1458 |
| 2018/0027004 A1* | 1/2018 | Huang | H04L 63/1425 726/23 |
| 2018/0077182 A1* | 3/2018 | Sartran | H04L 63/1425 |
| 2018/0367551 A1* | 12/2018 | Muddu | G06N 99/005 |

FOREIGN PATENT DOCUMENTS

| | | |
|---|---|---|
| JP | 2015-115842 | 6/2015 |
| JP | 2015115842 A * | 6/2015 ............. H04L 1/201 |

* cited by examiner

FIG. 9

| CONNECTION ID | SOURCE IP ADDRESS | SOURCE PORT NUMBER | DESTINATION IP ADDRESS | DESTINATION PORT NUMBER | PROTOCOL NUMBER |
|---|---|---|---|---|---|
| CN-0001 | 10.20.30.40 | 2000 | 10.20.30.50 | 20 | 6 |
| CN-0002 | 20.30.40.50 | 3000 | 10.20.30.60 | 80 | 6 |
| CN-0003 | 30.40.50.60 | 4000 | 40.50.60.70 | 3000 | 17 |
| ⋮ | ⋮ | ⋮ | ⋮ | ⋮ | ⋮ |

FIG. 10

| WRITE POINTER | READ POINTER | |
|---|---|---|
| 7 | 5 | |
| PACKET ID | CONNECTION ID | RECEPTION DATE AND TIME |
| PC-000001 | CN-0001 | 4/1 10:00:00.100 |
| PC-000002 | CN-0002 | 4/1 10:00:00.200 |
| PC-000003 | CN-0002 | 4/1 10:00:00.300 |
| PC-000004 | CN-0003 | 4/1 10:00:00.400 |
| PC-000005 | CN-0003 | 4/1 10:00:00.500 |
| PC-000006 | CN-0001 | 4/1 10:00:00.600 |
| NO SETTING | NO SETTING | NO SETTING |
| ⋮ | ⋮ | ⋮ |

| CONNECTION ID | SOURCE IP ADDRESS | SOURCE PORT NUMBER | DESTINATION IP ADDRESS | DESTINATION PORT NUMBER | PROTOCOL NUMBER |
|---|---|---|---|---|---|
| CN-0001 | 10.20.30.40 | 2000 | 10.20.30.50 | 20 | 6 |

| PACKET ID | OFFSET |
|---|---|
| PC-000001 | 0 |
| PC-000006 | 624 |
| ⋮ | ⋮ |

APPARATUS AND METHOD TO COLLECT PACKETS RELATED TO ABNORMAL CONNECTION

CROSS-REFERENCE TO RELATED APPLICATION

This application is based upon and claims the benefit of priority of the prior Japanese Patent Application No. 2015-236728, filed on Dec. 3, 2015, the entire contents of which are incorporated herein by reference.

FIELD

The embodiment discussed herein is related to apparatus and method to collect packets related to abnormal connection.

BACKGROUND

Patent literature discloses a network monitoring device configured to capture a packet passing through a switch by mirroring so as to monitor the state of a network.

This network monitoring device analyzes each captured packet in terms of the fourth layer (hereinafter referred to as L4) in an open systems interconnection (OSI) reference model of the International Organization for Standardization (ISO), and collects a packet related to a connection determined to be abnormal by the L4 analysis.

However, such collection of packets related to the abnormal connection requests a large amount of resources. Storing undesirable packets would be a waste of a storage region.

Related art is disclosed in Japanese Laid-open Patent Publication Nos. 2006-261804, 2015-95785, and 2015-115842.

SUMMARY

According to an aspect of the invention, an apparatus allocates a packet identifier to each of packets captured from a network, and stores the each packet in a buffer. The apparatus associates, with each of the packet identifiers, a connection identifier specifying a connection for a packet identified by the each packet identifier, detects a connection to which a primary abnormality is occurring by analyzing packets stored in the buffer, and stores, for each of connections to which the primary abnormality has occurred, a primary-abnormality group of packets to which the packet identifiers associated with the connection identifier of the each connection are allocated, in a first storage region. The apparatus detects a connection to which a secondary abnormality is occurring, based on a statistical value related to results of analyses on packets captured in a sampling duration, and writes, in a second storage region, secondary-abnormality groups of packets related to connections to which the secondary abnormality has occurred, among the primary-abnormality groups stored in the first storage region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a connection table, according to an embodiment;

FIG. 10 is a diagram illustrating an example of an index table, according to an embodiment;

DESCRIPTION OF EMBODIMENT

It is desirable to collect a packet related to an abnormal connection by using a smaller amount of resources.

Figure 1:
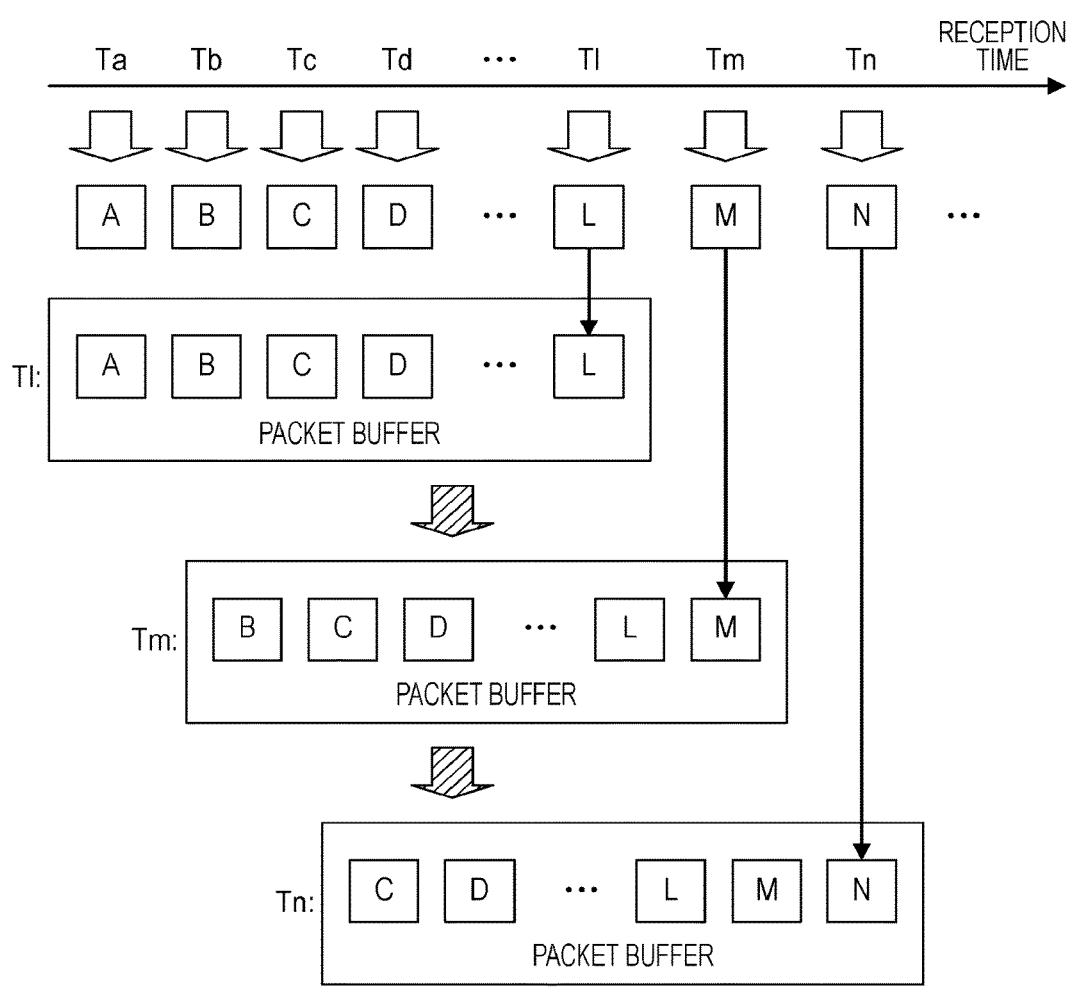
FIG. 1 is a diagram illustrating an example of buffering, according to an embodiment.

A network monitoring device according to the embodiment captures and buffers a packet transmitted through a monitoring target network. FIG. 1 illustrates exemplary buffering. The horizontal axis represents a reception time at which the packet is captured. This example illustrates how packets A to N are captured. Times Ta to Tn are the reception times of packets A to N.

The captured packets are stored in a packet buffer of the network monitoring device. In this example, at time TI at which packet L is captured, packet L is stored in the packet buffer. At this time, packets A to L are stored in the packet buffer.

Next, at time Tm at which packet M is captured, packet M is stored in the packet buffer. Since storing packet M exceeds the capacity of the packet buffer, oldest packet A is deleted.

Next, at time Tn at which packet N is captured, packet N is stored in the packet buffer. Since storing packet N exceeds the capacity of the packet buffer, oldest packet B is deleted. In this manner, when storing another packet exceeds the capacity of the packet buffer, the oldest packet is discarded.

Figure 2:
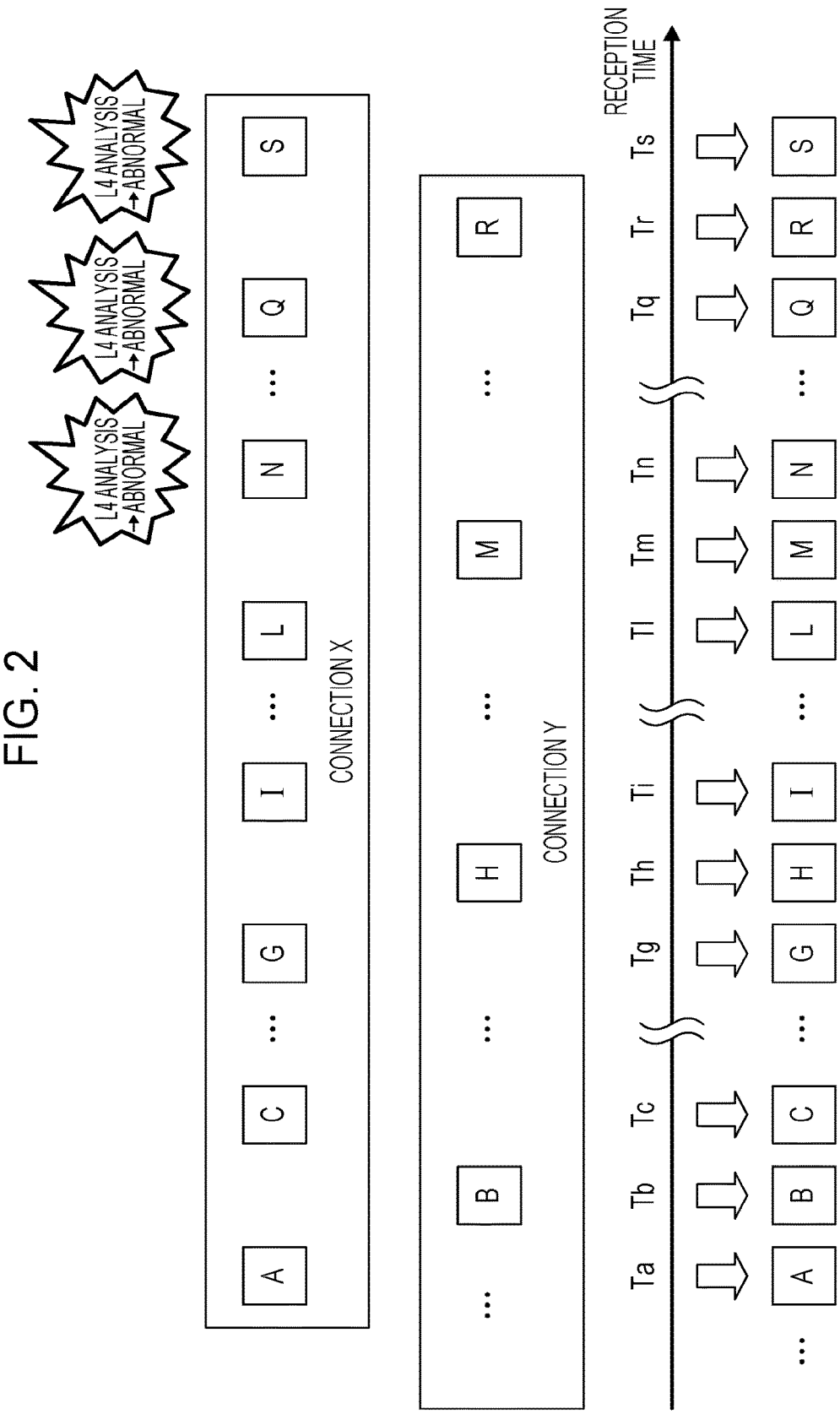
FIG. 2 is a diagram illustrating an example of a case in which a primary abnormality occurs, according to an embodiment.

FIG. 2 illustrates a relation between packets stored in the packet buffer and connections. Among the packets illustrated, packet A, packet C, packet G, packet I, packet L, packet N, packet Q, and packet S are packets related to connection X. Similarly, packet B, packet H, packet M, and packet R are packets related to connection Y.

A connection is specified by a source internet protocol (IP) address, a source port number, a destination IP address, and a destination port number included in the header of a packet.

In the embodiment, an L4 analysis is performed on each packet. The L4 analysis is an analysis related to L4. The L4 analysis detects a connection to which an abnormality such as a loss increase, a round trip time (RTT) increase, or a server delay increase occurs. In the embodiment, the abnormality detected by the L4 analysis is also referred to as a primary abnormality.

In this example, the L4 analysis detects no abnormality in each packet related to connection Y. The L4 analysis also detects no abnormality in packets A to L among the packets related to connection X. However, the L4 analysis detects an abnormality in each of packets N to S.

In the embodiment, each packet in which an abnormality is detected by the L4 analysis is collected, and an object including these packets is generated. These packets are used to analyze any abnormality of connections later.

Figure 3:
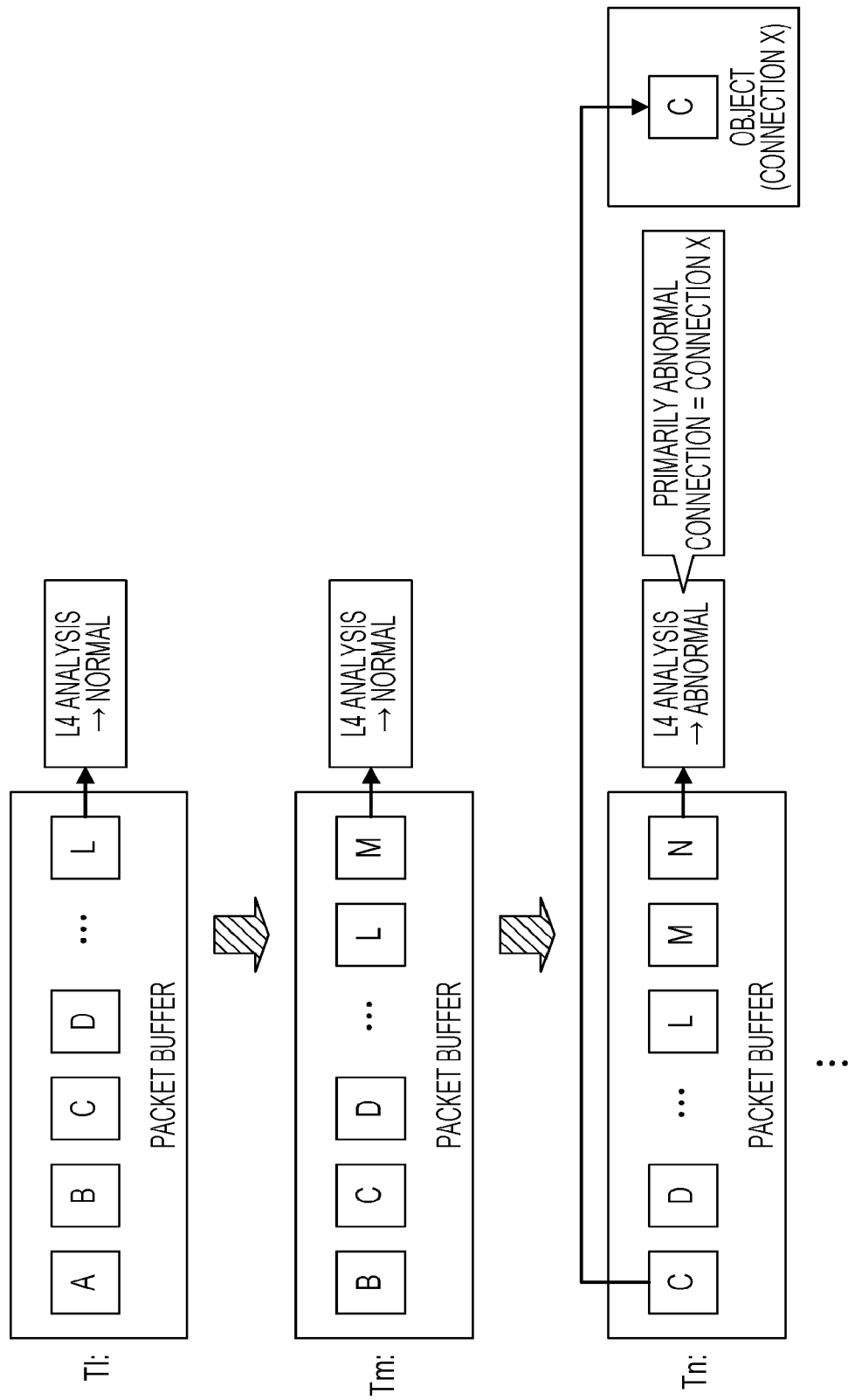
FIG. 3 is a diagram illustrating an example of a case in which an object is generated, according to an embodiment.
Figure 4:
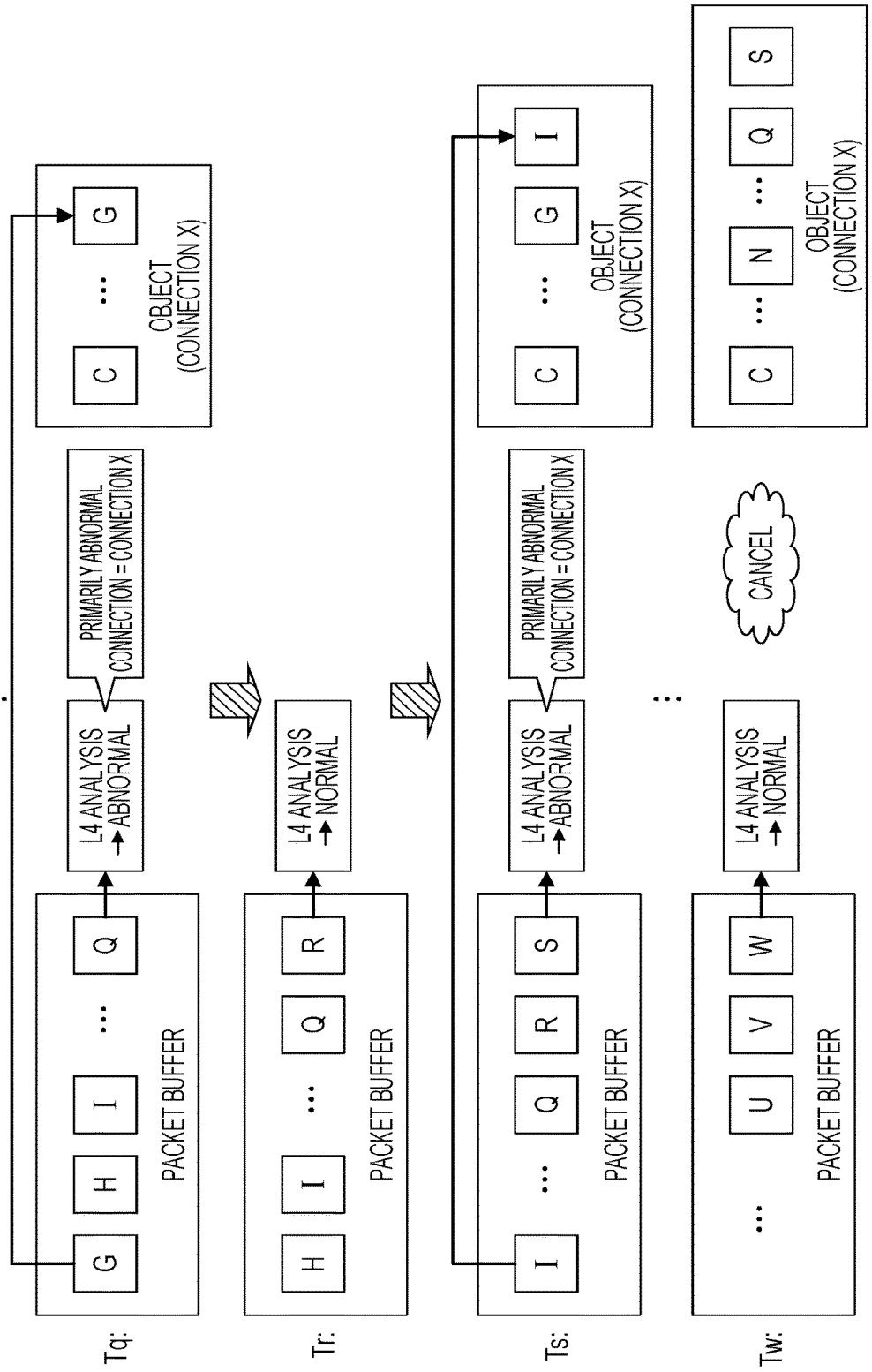
FIG. 4 is a diagram illustrating an example of a case in which an object is generated, according to an embodiment.

FIGS. 3 and 4 illustrate an example in which an object is generated. As illustrated in FIG. 2, a result of the L4 analysis on packet L captured at time TI is normal. When the result of L4 analysis is normal, an object including this packet is not generated.

Similarly, a result of the L4 analysis on packet M captured at time Tm is also normal, and thus no object is generated.

However, a result of the L4 analysis on packet N captured at time Tn is abnormal. Connection X specified by packet N is registered as a primarily abnormal connection. Then, an object related to connection X, which is the primarily abnormal connection, is generated. Packets related to connection X are sequentially added to this object. In this manner, an object is generated for each primarily abnormal connection, and packets related to the primarily abnormal connection are grouped.

As illustrated, packet C captured before packet N is added to the object. Thus, a packet captured back in time and related to the same connection as that of a packet at which a primary abnormality is detected is recorded. In this manner, storing packets before a time at which the abnormality occurs allows an analysis on any sign of the abnormality. This time duration back in time is also referred to as a predetermined time or a delay time in the following.

The following description is made with reference to FIG. 4. A result of the L4 analysis on packet Q captured at time Tq is also abnormal. As described above, packet G, which is captured back in time by the predetermined time, is added to the object.

A result of the L4 analysis on packet R captured at time Tr is normal, and thus no object is generated.

A result of the L4 analysis on packet S captured at time Ts is abnormal. As described above, packet I, which is captured back in time by the predetermined time, is added to the object.

Connection X is managed as the primarily abnormal connection until packet S in which an abnormality is detected last is added to the object. Then, once packet S is added to the object, connection X is no longer the primarily abnormal connection. In this manner, it is possible to include in the object any packet to which a primary abnormality occurs.

The object described above is temporarily stored in a memory region. The following describes an operation to write the object generated in the memory region to a storage region.

In the embodiment, L4 statistical processing is performed separately from L4 analysis processing. The L4 statistical processing is periodically performed. In the L4 statistical processing, packets related to the same connection are provided with statistical processing of the number of transmitted and received packets, the number of bytes, the number of packet losses, RTTs, and the like with a period of a sampling duration. In the embodiment, an abnormality detected by the L4 statistical processing is also referred to as a secondary abnormality. When a secondary abnormality is detected, an object related to a connection to which this secondary abnormality occurs is written to the storage region.

Figure 5:
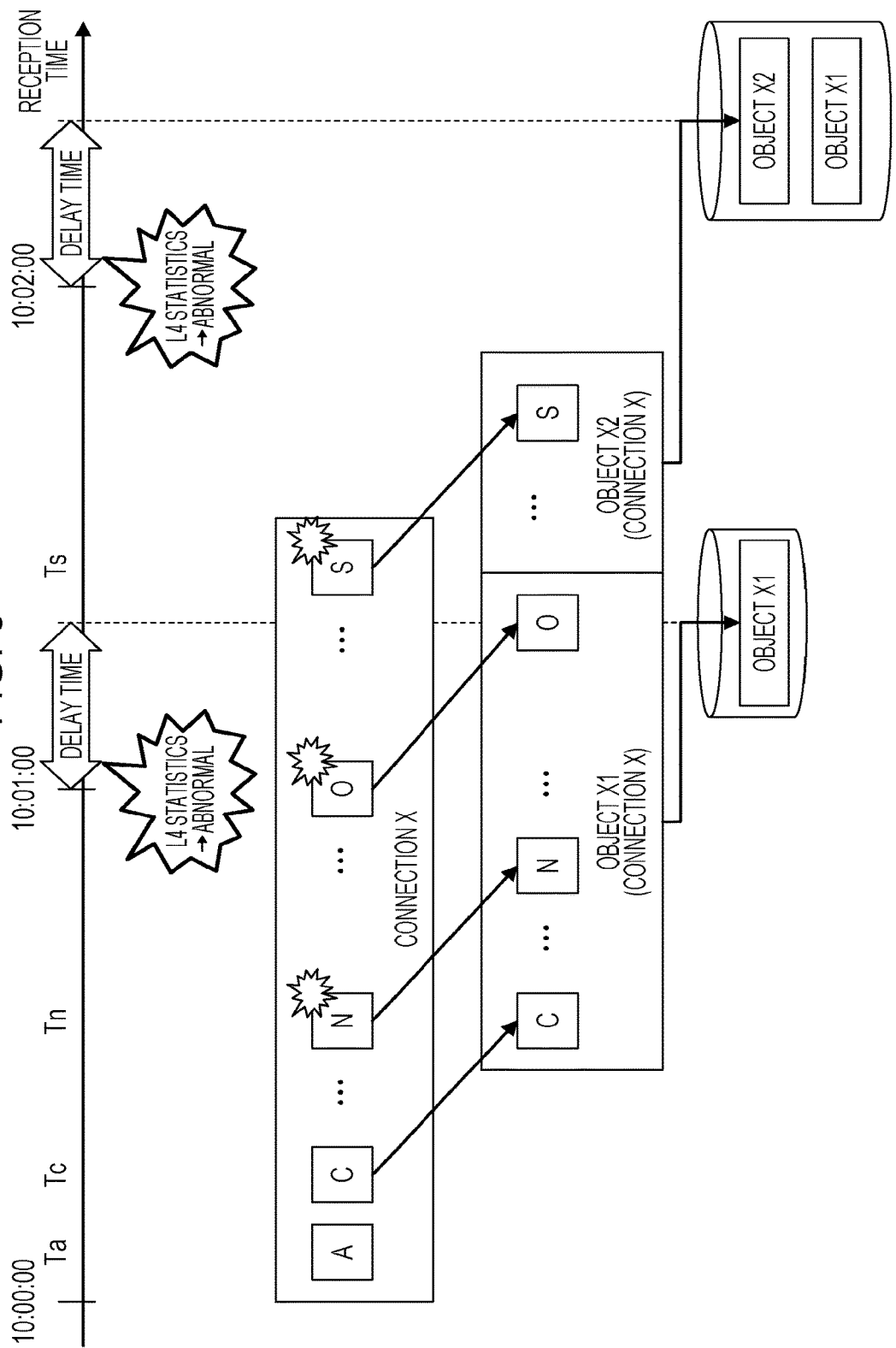
FIG. 5 is a diagram illustrating an example of a case in which a secondary abnormality occurs, according to an embodiment.

FIG. 5 illustrates an example in which a secondary abnormality occurs. In this example, the L4 statistical processing has a period of one minute. Specifically, the L4 statistical processing is performed at 10:00:00, 10:01:00, and 10:02:00.

The L4 statistical processing at 10:00:00 detects no abnormality. Thereafter, as illustrated in FIGS. 2 to 4, primary abnormalities occur in packets N to S among the packets related to connection X. As described above, when a primary abnormality occurs to packet N, an object of connection X including packet C is generated. Packet N is added to the object when the delay time has elapsed.

The L4 statistical processing at 10:01:00 detects an abnormality related to connection X. However, when the secondary abnormality is detected, the object is not written yet. When packet O captured at 10:01:00 is added to the object, the object is written. In other words, when the delay time elapsed since the L4 statistical processing, writing of the object is performed.

In this manner, objects are written by the period. In this example, object X1 represents an object of connection X corresponding to a period of 10:00:00 to 10:01:00. Object X2 represents an object of connection X corresponding to a period of 10:01:00 to 10:02:00.

The L4 statistical processing at 10:02:00 also detects an abnormality related to connection X. Similarly, when the delay time has elapsed, writing of object X2 of connection X is performed.

When writing of an object to the storage region is completed, this object in the memory region is deleted. In this example, when writing of object X1 is performed, object X1 in the memory region is deleted. Then, object X2 is newly generated. When writing of object X2 is performed, object X2 in the memory region is deleted. This only requests a small capacity of the memory region.

Figure 6:
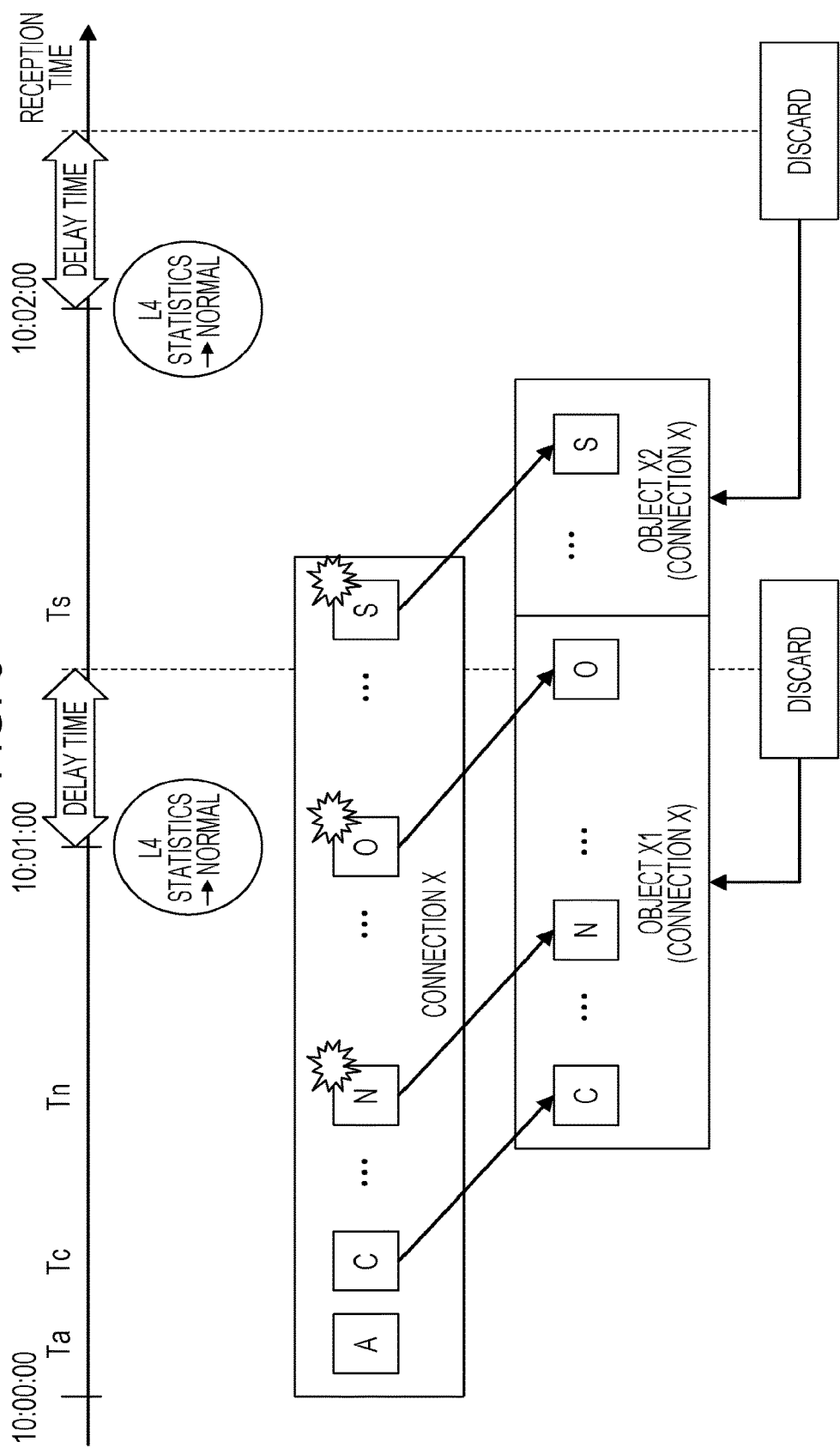
FIG. 6 is a diagram illustrating an example a case in which a primary abnormality occurs and a secondary abnormality does not occur, according to an embodiment.

FIG. 6 illustrates an example in which a primary abnormality occurs and a secondary abnormality does not occur. In the embodiment, writing of an object is not performed when no secondary abnormality occurs.

Similarly to FIG. 5, primary abnormalities are detected in packets related to connection X. However, the L4 statistical processing at 10:01:00 detects no secondary abnormality in connection X. If an abnormality detected in the L4 analysis processing is erroneous, the L4 statistical processing may detect no abnormality in the same connection in some cases.

Such a phenomenon occurs sometimes when the number of samples in the L4 statistical processing is larger than the number of samples in the L4 analysis processing. Such a phenomenon also occurs sometimes when the kind and criteria of determination in the L4 statistical processing is different from the kind and criteria of determination in the L4 analysis processing. In this example, the certainty of abnormality determination by the L4 statistical processing is assumed to be higher than the certainty of abnormality determination by the L4 analysis processing. It is also assumed that a post analysis is performed on a connection to which a secondary abnormality occurs. Thus, an object of any connection related only to the primary abnormality is undesirable.

As illustrated, the L4 statistical processing at 10:01:00 determines that connection X is normal. Thus, writing of object X1 is not performed when the delay time has elapsed. Then, object X1 in the memory region is discarded without processing.

Similarly, the L4 statistical processing at 10:02:00 determines that connection X is normal. In this case, too, writing of object X2 is not performed when the delay time has elapsed. Then, object X2 in the memory region is discarded without processing.

This leads to reduced usage amounts of the memory region and the storage region.

Figure 7:
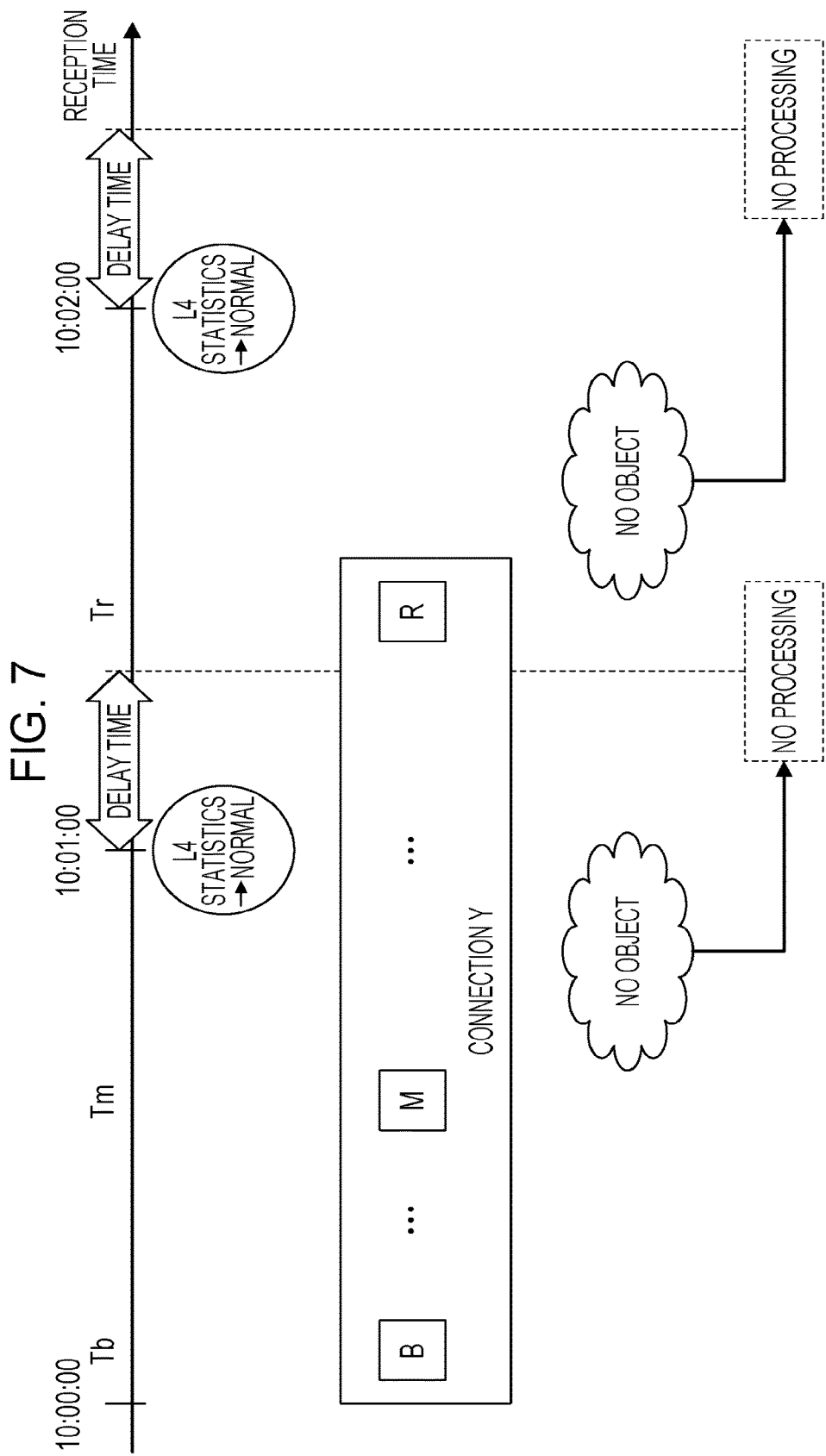
FIG. 7 is a diagram illustrating an example of a case in which a primary abnormality does not occur, according to an embodiment.

The following describes a case in which no primary abnormality occurs. FIG. 7 illustrates an example in which no primary abnormality occurs. As illustrated in FIG. 2, the L4 analysis detects no abnormality in packets related to connection Y. Thus, an object of connection Y is not generated.

The L4 statistical processing at 10:01:00 detects no abnormality in connection Y. Thus, when the delay time has elapsed from 10:01:00, no processing related to connection Y is performed.

Similarly, the L4 statistical processing at 10:02:00 detects no abnormality in connection Y. Similarly, when the delay time has elapsed from 10:01:00, no processing related to connection Y is performed.

This leads to a reduced usage amount of the memory region. This ends description of an outline of the embodiment.

Figure 8:
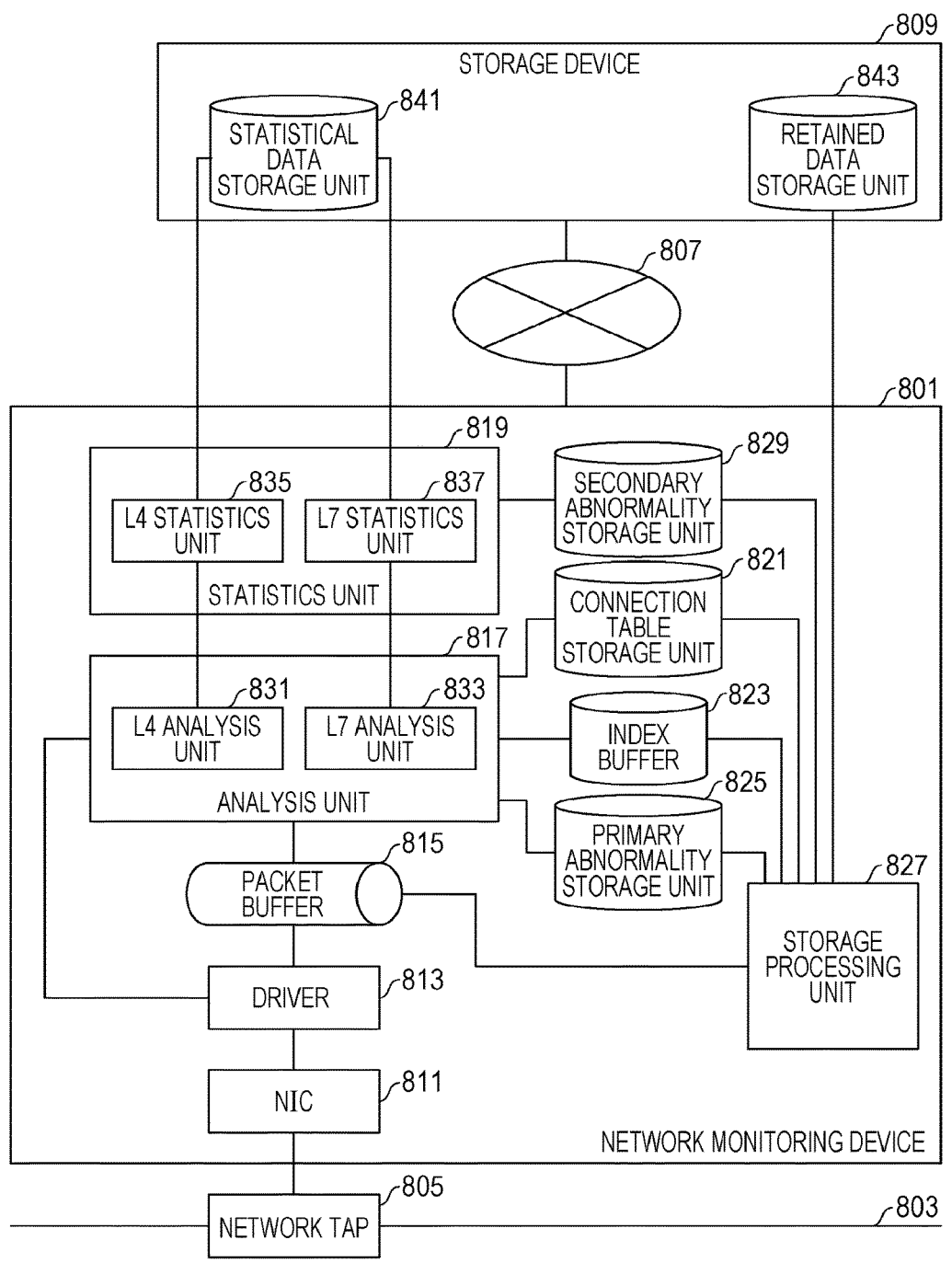
FIG. 8 is a diagram illustrating an example of a configuration of a network monitoring system, according to an embodiment.

FIG. 8 illustrates an exemplary configuration of a network monitoring system. A network monitoring device 801 is coupled to the monitoring target network 803 through a network tap 805. The monitoring target network 803 is, for example, a local area network (LAN). The network monitoring device 801 captures a packet transmitted through the monitoring target network 803. For example, a packet passing through a switch of the monitoring target network 803 is copied to a mirror port and captured. Alternatively, a packet may be captured through the tap. A packet is an exemplary PDU.

The network monitoring device 801 includes a network interface card (NIC) 811, a driver 813, a packet buffer 815, an analysis unit 817, a statistics unit 819, a connection table storage unit 821, an index buffer 823, a primary abnormality storage unit 825, a storage processing unit 827, and a secondary abnormality storage unit 829.

The NIC 811 is an interface card to be coupled to a network. The driver 813 extracts a packet, stores the extracted packet in the packet buffer 815, and allocates an identifier (ID) to the extracted packet. The packet buffer 815 stores therein packets.

The analysis unit 817 mainly analyzes a packet, specifies a connection to which an abnormality occurs, and generates an index record for separating packets for each connection. Providing the index record reduces a load on processing of collecting packets. The analysis unit 817 includes an L4 analysis unit 831 and an L7 analysis unit 833. The L4 analysis unit 831 performs an analysis related to the fourth layer in an OSI reference model of the ISO. The L7 analysis unit 833 performs an analysis related to the seventh layer (hereinafter referred to as an L7) in the OSI reference model of the ISO.

The statistics unit 819 performs statistical processing based on an analysis result. The statistics unit 819 includes an L4 statistics unit 835 and an L7 statistics unit 837. The L4 statistics unit 835 performs statistical processing related to L4. Specifically, the L4 statistics unit 835 diagnoses a network state based on statistical values such as the number of transmitted and received packets, the number of transmitted and received bytes, the number of packet losses, RTTs, and the like. The L7 statistics unit 837 performs statistical processing related to L7.

The connection table storage unit 821 stores therein a connection table related to a connection extracted from a packet. The index buffer 823 stores therein an index table that associates packets and connections. The index table manages index records, for example, in a ring buffer format. The primary abnormality storage unit 825 stores therein a primary abnormality table for specifying a connection to which a primary abnormality occurs. The secondary abnormality storage unit 829 stores therein a secondary abnormality table for specifying a connection to which a secondary abnormality occurs and a table list that manages the secondary abnormality table.

The network monitoring device 801 is coupled to a storage device 809 through a transmission network 807. The storage device 809 includes a statistical data storage unit 841 and a retained data storage unit 843. The statistical data storage unit 841 stores therein a result of the statistical processing in the statistics unit 819. The retained data storage unit 843 stores therein retained data transmitted from the network monitoring device 801. The transmission network 807 may be the same network as the monitoring target network 803.

The driver 813, the analysis unit 817, the statistics unit 819, the storage processing unit 827, the L4 analysis unit 831, the L7 analysis unit 833, the L4 statistics unit 835, and the L7 statistics unit 837 described above are implemented by using hardware resources (for example, FIG. 28) and a computer program that causes a processor to execute processing described below.

Figure 28:
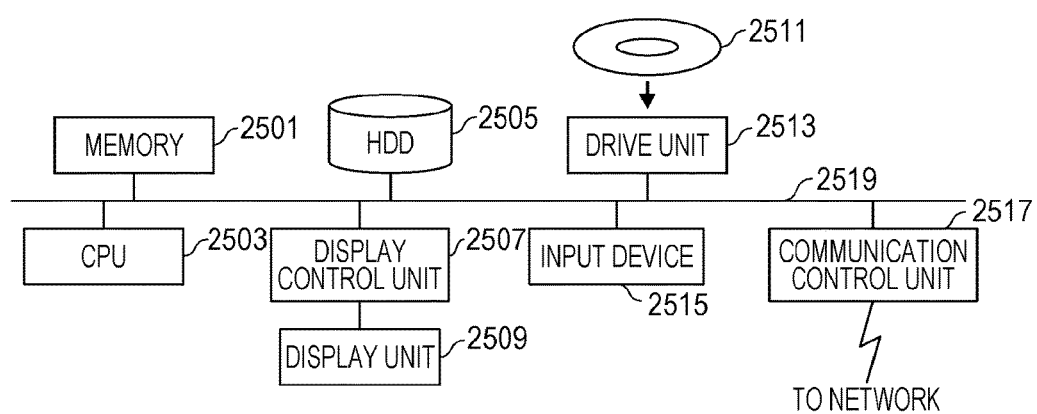
FIG. 28 is a diagram illustrating an example of a configuration of a computer, according to an embodiment.

The packet buffer 815, the connection table storage unit 821, the index buffer 823, the primary abnormality storage unit 825, and the secondary abnormality storage unit 829 described above are implemented by using hardware resources (for example, FIG. 28).

The following describes the connection table. FIG. 9 illustrates an exemplary connection table. The connection table lists data defining connection for each connection.

The connection table includes a record for each connection. The record includes a field in which a connection ID is set, a field in which a source IP address is set, a field in which a source port number is set, a field in which a destination IP address is set, a field in which a destination port number is set, and a field in which a protocol number is set.

The connection ID is an identifier for specifying a connection. The source IP address is the IP address of a host device as the source of a packet. The source port number is a number assigned to a port of the host device as the source of the packet, via which this packet is sent. The destination IP address is the IP address of a host device as the destination of this packet. The destination port number is a number assigned to a port of the host device as the destination of this packet, via which this packet is received. The protocol number is a number for identifying the protocol of the fourth layer in the OSI reference model of the ISO. The protocol number "6" indicates Transmission Control Protocol (TCP), and the protocol number "17" indicates User Datagram Protocol (UDP).

The first record in this example indicates, for a connection to which connection ID "CN-0001" is allocated, that the source is port number "2000" in a host device at IP address "10.20.30.40", and the destination is port number "20" in a host device at IP address "10.20.30.50". The first record also indicates that the protocol of the fourth layer in this connection is TCP.

The second record in this example indicates, for a connection to which connection ID "CN-0002" is allocated, that the source is port number "3000" in a host device at IP address "20.30.40.50", and the destination is port number "80" in a host device at IP address "10.20.30.60". The second record also indicates that the protocol of the fourth layer in this connection is TCP.

The third record in this example indicates, for a connection to which connection ID "CN-0003" is allocated, that the source is port number "4000" in a host device at IP address "30.40.50.60", and the destination is port number "3000" in a host device at IP address "40.50.60.70". The third record also indicates that the protocol of the fourth layer in this connection is UDP.

The following describes the index table. FIG. 10 illustrates an exemplary index table. The index table includes a header part. The header part includes a field in which a write pointer is set and a field in which a read pointer is set. The write pointer specifies an index record to be written. The read pointer specifies an index record to be read.

The index table includes data of an index record for each packet. The record includes a field in which a packet ID is set, a field in which a connection ID is set, and a field in which a reception date and time is set. The packet ID is an identifier sequentially added to a captured packet. The connection ID identifies a connection specified by the header of the packet. The reception date and time specifies date and time when the packet is captured. These index records are managed in the form of a ring such that the last index record is followed by the first index record.

This example illustrates that new data is set to the seventh index record next. Similarly, it is illustrated that data set to the fifth index record is read next.

Figures 11, 12:
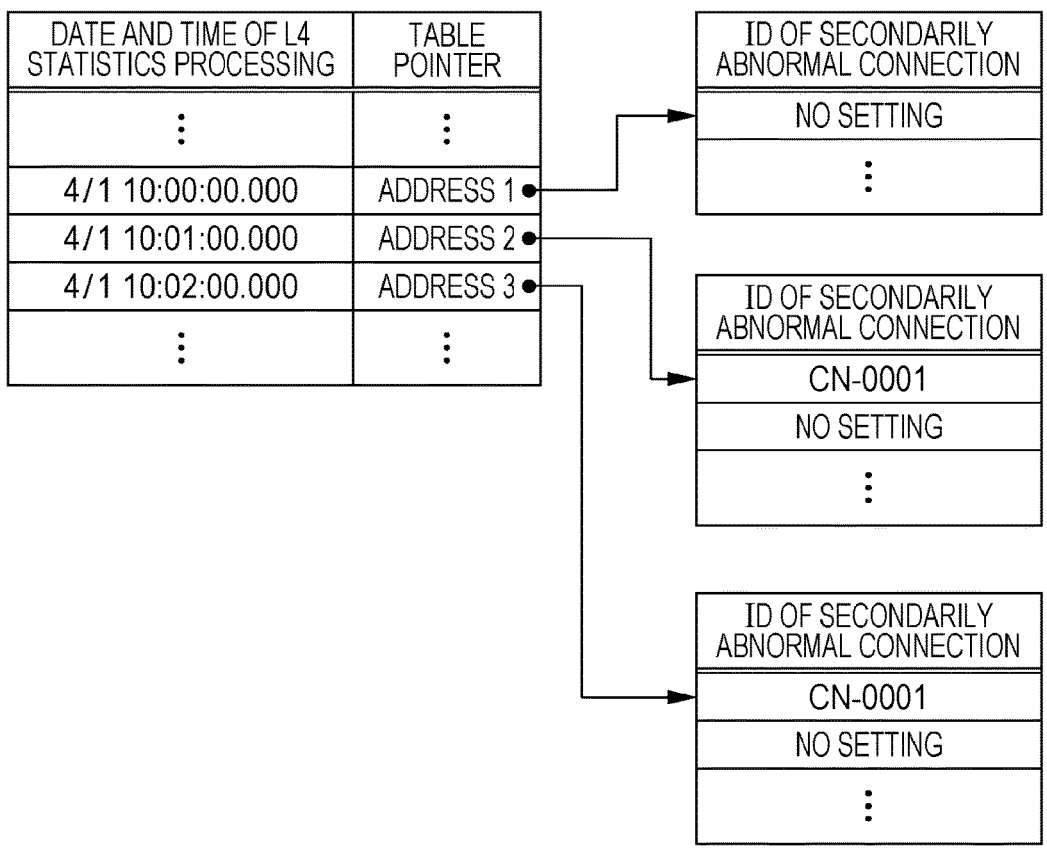
FIG. 11 is a diagram illustrating an example of a primary abnormality table, according to an embodiment.
FIG. 12 is a diagram illustrating an example of a table list and a secondary abnormality table, according to an embodiment.

The following describes the primary abnormality table. FIG. 11 illustrates an exemplary primary abnormality table. In this example, the primary abnormality table includes a record of each connection to which an abnormality such as a loss increase, a RTT increase, or a server delay increase occurs. The record includes a field in which the connection ID of the connection to which the primary abnormality occurs is set, and a field in which last date and time is set. The last date and time specifies date and time when a primary abnormality is detected last in this connection.

The first record in this example indicates that a primary abnormality occurs in a connection specified by connection ID "CN-0001" and was detected last at 10 hours 00 minutes 00.000 seconds on April 1.

Similarly, the second record in this example indicates that a primary abnormality also occurs in a connection specified by connection ID "CN-0004" and was detected last at 10 hours 00 minutes 01.000 seconds on April 1.

The following describes the table list and the secondary abnormality table. FIG. 12 illustrates an exemplary table list and exemplary secondary abnormality tables. The secondary abnormality table is generated in each period. The table list includes a record corresponding to a secondary abnormality table in each period. A table pointer specifies the storage location of the secondary abnormality table. The secondary abnormality table lists the ID of a connection in which a secondary abnormality is detected by the L4 statistical processing in this period.

Figure 13:
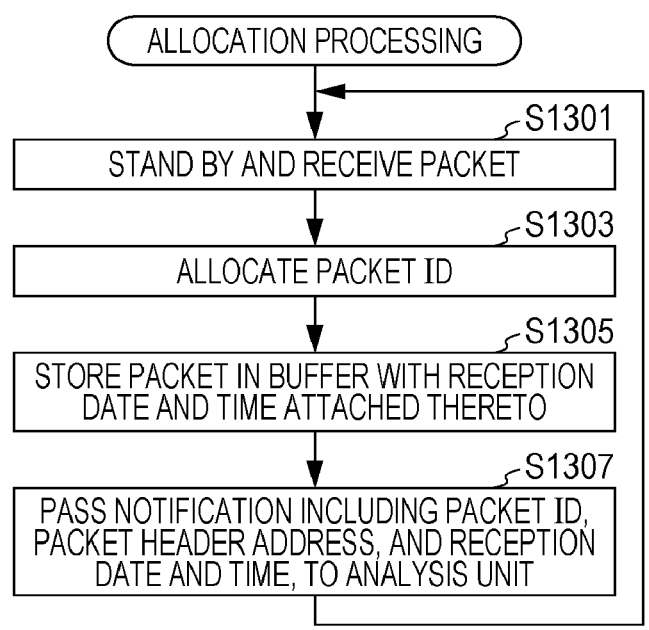
FIG. 13 is a diagram illustrating an example of an operational flowchart for allocation processing, according to an embodiment.

The following describes processing at the network monitoring device 801. The description is first made on allocation processing by the driver 813. FIG. 13 illustrates an operational flowchart for the allocation processing. The driver 813 allocates a packet ID to each packet captured from the monitoring target network 803, and stores the packet in the packet buffer 815 with its reception date and time attached thereto.

Specifically, the driver 813 stands by and receives a packet from the NIC 811 (S1301). Having received a packet from the NIC 811, the driver 813 allocates a packet ID to the received packet (S1303). The packet ID is sequentially allocated. Then, the driver 813 stores the packet in the packet buffer 815 with its reception date and time attached thereto (S1305). The driver 813 passes, to the analysis unit 817, a notification including the packet ID, the address of the header of the packet, and the reception date and time (S1307). Then, the process returns to processing at S1301.

Figure 14:
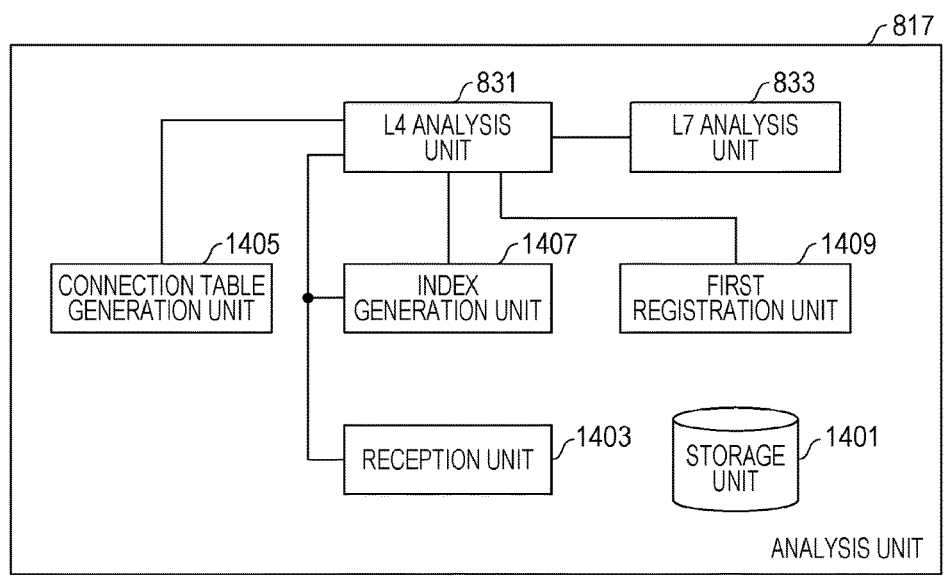
FIG. 14 is a diagram illustrating an example of a module configuration of an analysis unit, according to an embodiment.

The following describes a module configuration of the analysis unit 817. FIG. 14 illustrates an exemplary module configuration of the analysis unit 817. The analysis unit 817 includes, in addition to the L4 analysis unit 831 and the L7 analysis unit 833, a storage unit 1401, a reception unit 1403, a connection table generation unit 1405, an index generation unit 1407, and a first registration unit 1409.

The storage unit 1401 stores therein data used inside the analysis unit 817. The reception unit 1403 receives the notification from the driver 813. The connection table generation unit 1405 generates the connection table. The index generation unit 1407 generates the index table. The first registration unit 1409 registers a primarily abnormal connection in the primary abnormality table.

The reception unit 1403, the connection table generation unit 1405, the index generation unit 1407, and the first registration unit 1409 described above are implemented by using hardware resource (for example, FIG. 28) and a computer program that causes a processor to execute the processing described below.

The storage unit 1401 described above is implemented by using hardware resources (for example, FIG. 28).

Figure 15:
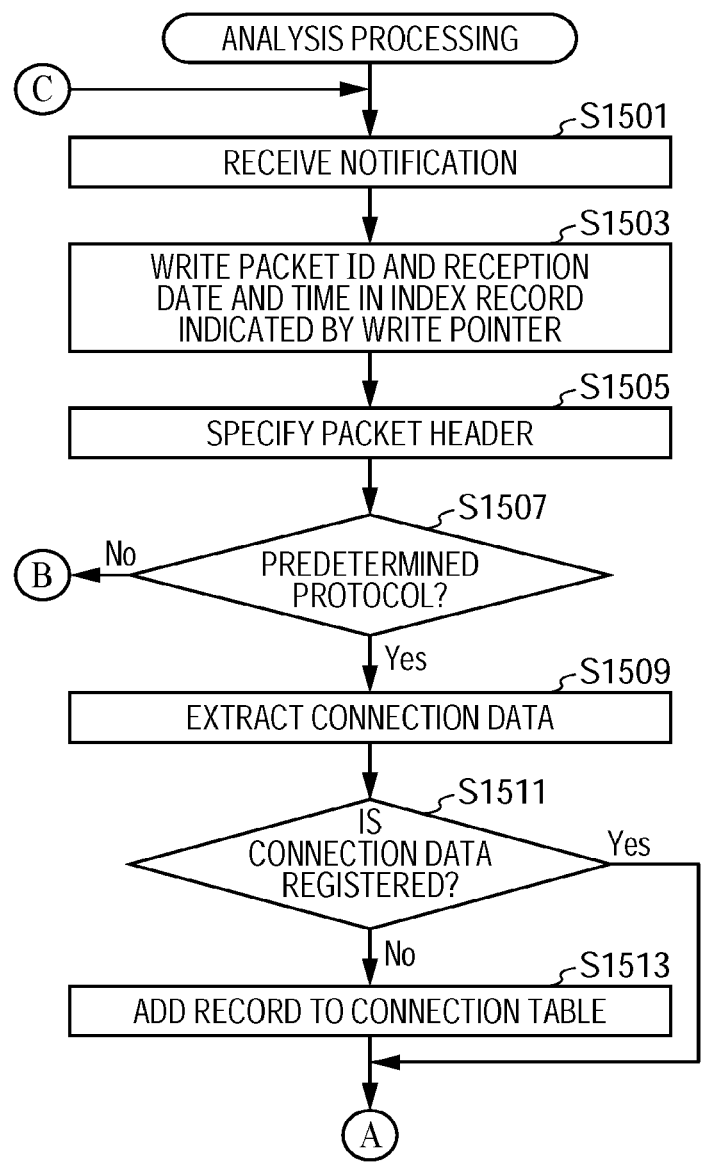
FIG. 15 is a diagram illustrating an example of an operational flowchart for analysis processing, according to an embodiment.
Figure 16:
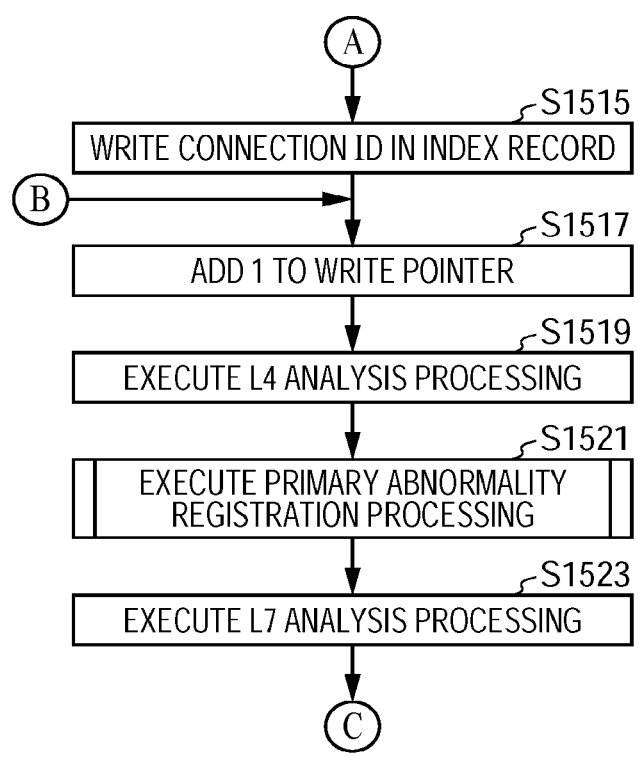
FIG. 16 is a diagram illustrating an example of an operational flowchart for analysis processing, according to an embodiment.

The following describes analysis processing by the analysis unit 817. FIGS. 15 and 16 illustrate a process of the analysis processing. When the reception unit 1403 receives the notification from the driver 813 (S1501), the index generation unit 1407 writes a packet ID and a reception date and time obtained from the notification to an index record indicated by a write pointer (S1503). The index generation unit 1407 may read a reception date and time attached to a packet in the packet buffer 815.

The L4 analysis unit 831 specifies the header of a packet based on an address included in the notification (S1505). The L4 analysis unit 831 determines whether the protocol of this packet is a predetermined protocol (S1507). The predetermined protocol is, for example, TCP and UDP. The predetermined protocols may be set to, for example, a protocol table stored in the storage unit 1401. When it is determined that the protocol of this packet is not a predetermined protocol, the process proceeds to processing at S1517 in FIG. 16 through link B. At this stage, the connection ID field in a new record is yet to be set.

When it is determined that the protocol of this packet is a predetermined protocol, the L4 analysis unit 831 extracts connection data from the header of the packet (S1509). The connection data includes a source IP address, a source port number, a destination IP address, a destination port number, and a protocol number. The connection table generation unit 1405 determines whether the connection data is previously registered in the connection table (S1511). When it is determined that the connection data is previously registered in the connection table, the process proceeds to processing at S1515 in FIG. 16 through link A.

When it is determined that the connection data is yet to be registered in the connection table, the connection table generation unit 1405 adds a new record to the connection table (S1513). A new connection ID and this connection data are set to the new record. Specifically, the connection ID, the source IP address, the source port number, the destination IP address, the destination port number, and the protocol number are set to the new record. After processing at S1513 is completed, the process proceeds to processing at S1515 in FIG. 16 through link A.

In processing in FIG. 16, the index generation unit 1407 writes a connection ID in this index record (S1515). The connection ID is specified based on the connection table.

The index generation unit 1407 adds one to the write pointer (S1517). When the write pointer is indicating the last record number, the index generation unit 1407 returns the write pointer back to the first record number.

Subsequently, the L4 analysis unit 831 executes the L4 analysis processing (S1519). In the L4 analysis processing, the L4 analysis unit 831 detects a connection to which an abnormality is occurring. In this example, the L4 analysis unit 831 detects a connection in which a loss increase occurs, a connection in which a RTT increase occurs, and a connection in which a server delay increase occurs. The L4 analysis unit 831 outputs the ID of the connection to which an abnormality is occurring as a result of the detection. The L4 analysis processing is the same as the conventional processing, and thus further description thereof will be omitted below.

Figure 17A:
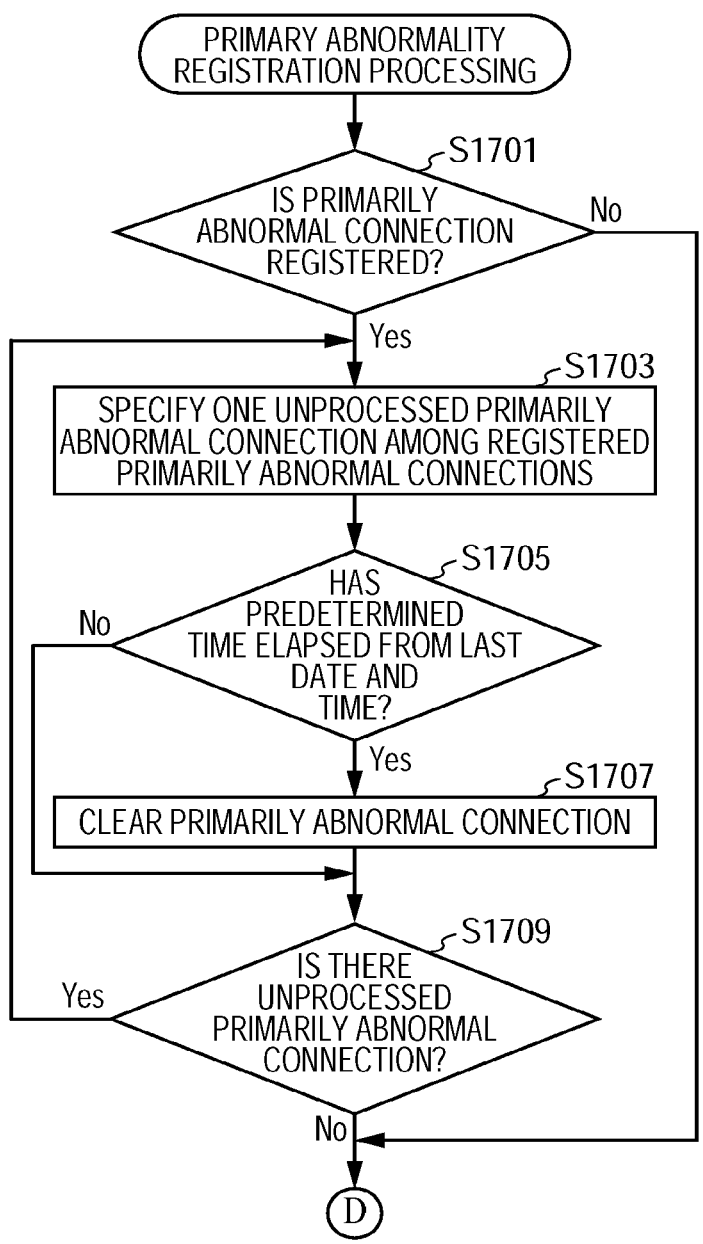
FIG. 17A is a diagram illustrating an example of an operational flowchart for primary abnormality registration processing, according to an embodiment.
Figure 17B:
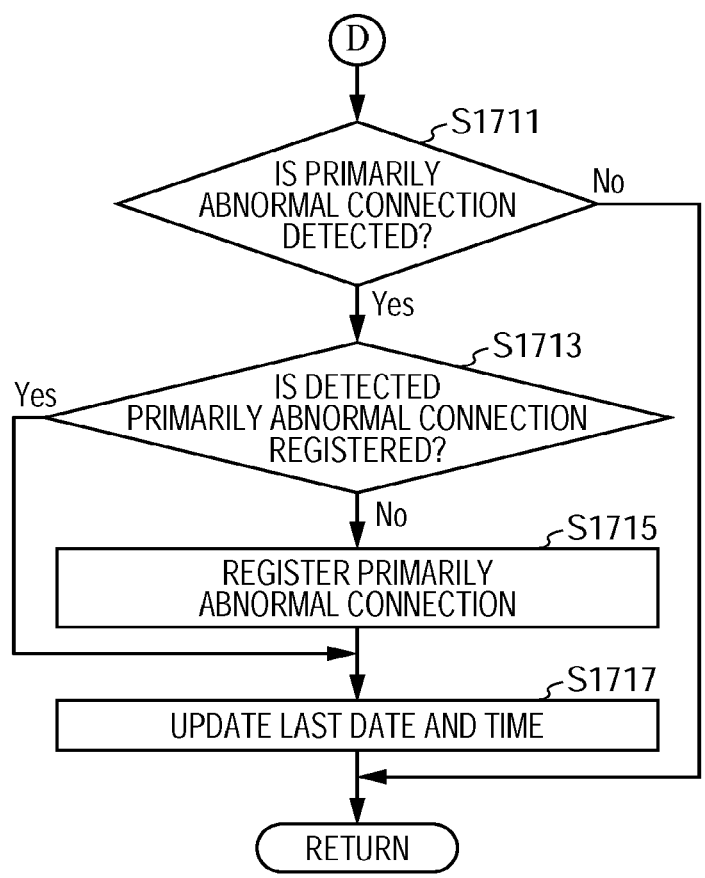
FIG. 17B is a diagram illustrating an example of an operational flowchart for primary abnormality registration processing, according to an embodiment.

The first registration unit 1409 executes the primary abnormality registration processing (S1521). FIGS. 17A and 17B illustrate a process of the primary abnormality registration processing. The first registration unit 1409 determines whether a primarily abnormal connection is registered in the primary abnormality table (S1701). When it is determined that no primarily abnormal connection is registered in the primary abnormality table, the process proceeds to processing at S1711 in FIG. 17B through link D.

When it is determined that a primarily abnormal connection is registered in the primary abnormality table, the first registration unit 1409 specifies one unprocessed primarily abnormal connection among the primarily abnormal connections registered in the primary abnormality table (S1703). The first registration unit 1409 may sequentially specify connection IDs set in the primary abnormality table.

The first registration unit 1409 determines whether the predetermined time (corresponding to the delay time) has elapsed from the last date and time (date and time when this primary abnormality is detected last) (S1705).

When it is determined that the predetermined time has elapsed from the last date and time, the first registration unit 1409 clears this primarily abnormal connection (S1707). Specifically, each field of the record in the primary abnormality table is cleared. Then, the process proceeds to processing at S1709.

When it is determined that the predetermined time has not elapsed from the last date and time, the process proceeds to processing at S1709.

The first registration unit 1409 determines whether there is an unprocessed primarily abnormal connection (S1709). When it is determined that there is an unprocessed primarily abnormal connection, the process returns to S1703, and the first registration unit 1409 repeats the processing described above.

When it is determined that there is no unprocessed primarily abnormal connection, the process proceeds to processing at S1711 in FIG. 17B through link D.

The following description is made with reference to FIG. 17B. In the L4 analysis processing illustrated at S1519 in FIG. 15, it is determined whether a primarily abnormal connection is detected (S1711). When it is determined that no primarily abnormal connection is detected, the primary abnormality registration processing ends.

When it is determined that a primarily abnormal connection is detected, the first registration unit 1409 determines whether the detected primarily abnormal connection is previously registered (S1713). When the ID of the primarily abnormal connection is previously set in the primary abnormality table, the first registration unit 1409 determines that this primarily abnormal connection is registered. When it is determined that this primarily abnormal connection is registered, the process proceeds to processing at S1717.

When it is determined that this primarily abnormal connection is not registered, the first registration unit 1409 registers this primarily abnormal connection in the primary abnormality table (S1715). Specifically, the first registration unit 1409 specifies a record yet to be set in the primary abnormality table, and sets the ID of this primarily abnormal connection to this record.

The first registration unit 1409 updates the last date and time of this record (S1717). Specifically, the first registration unit 1409 sets the current date and time to the field of the last date and time of this record. Then, the primary abnormality registration processing ends, and the process proceeds to processing at S1523 illustrated in FIG. 16.

The following description is made with reference to FIG. 16. The L7 analysis unit 833 executes L7 analysis processing (S1523). The L7 analysis processing is the same as the conventional processing, and thus further description thereof will be omitted below.

After the processing illustrated in FIG. 16 is completed, the process returns to processing at S1501 illustrated in FIG. 15 through link C, and repeats the processing described above.

Figure 18:
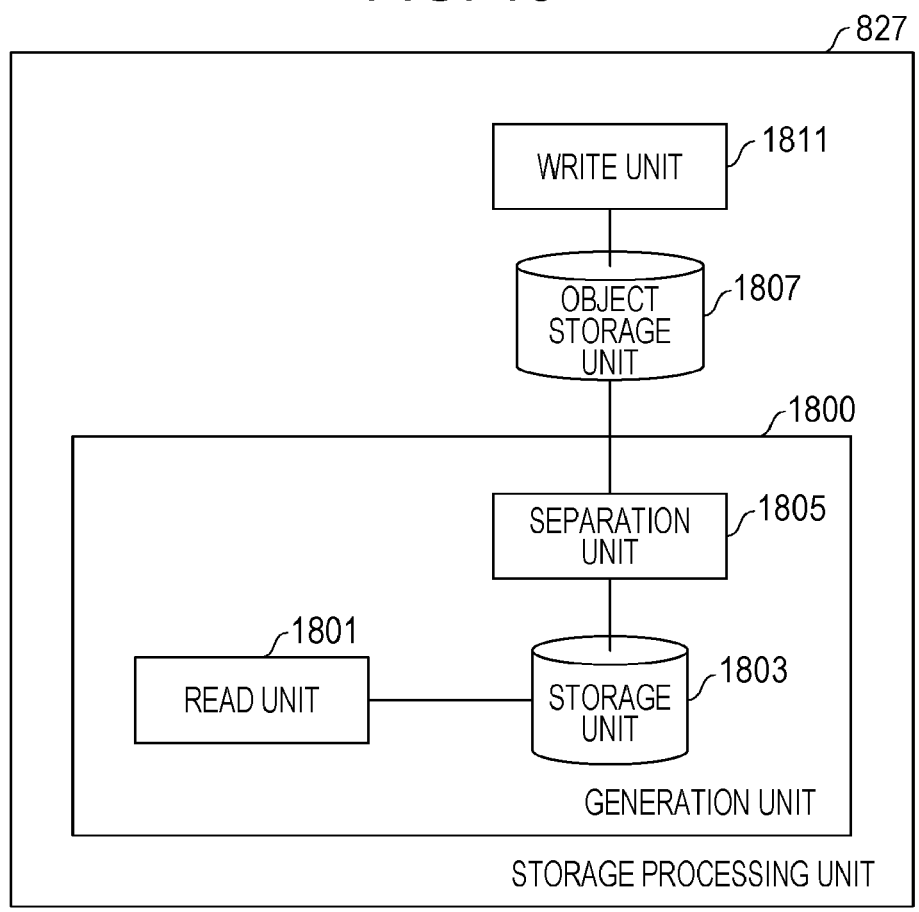
FIG. 18 is a diagram illustrating an example of a module configuration of a storage processing unit, according to an embodiment.

The following describes the storage processing unit 827. FIG. 18 illustrates an exemplary module configuration of the storage processing unit 827. The storage processing unit 827 includes a generation unit 1800, an object storage unit 1807, and a write unit 1811. The generation unit 1800 generates an object. The generation unit 1800 includes a read unit 1801, a storage unit 1803, and a separation unit 1805. The read unit 1801 reads an index from the index buffer 823. The storage unit 1803 temporarily stores therein the read index. The separation unit 1805 separates packets based on the indices.

The object storage unit 1807 stores therein an object (collection data and metadata related to the collection data). The write unit 1811 writes retained data (the table list, the secondary abnormality table, and the object) to the retained data storage unit 843.

The read unit 1801, the separation unit 1805, and the write unit 1811 described above are implemented by using hardware resources (for example, FIG. 28) and a computer program that causes a processor to execute the processing described below.

The storage unit 1803 and the object storage unit 1807 described above are implemented by using hardware resources (for example, FIG. 28).

Figure 19:
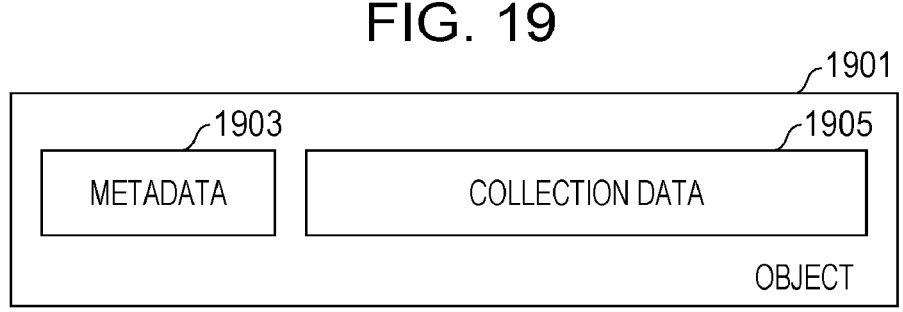
FIG. 19 is a diagram illustrating an example of a configuration of an object, according to an embodiment.

The following describes an object stored in the object storage unit 1807. FIG. 19 illustrates an exemplary configuration of the object. In this example, an object 1901 includes metadata 1903 and collection data 1905. The collection data 1905 is data as collection of separated packets. The metadata 1903 includes data related to a connection as a key of the separation and data related to the collection data 1905.

Figures 20, 21:
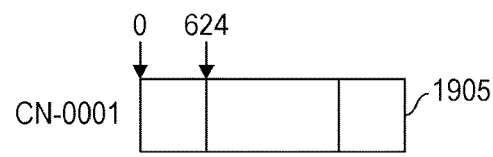
FIG. 20 is a diagram illustrating an example of metadata, according to an embodiment.
FIG. 21 is a diagram illustrating an example of collection data, according to an embodiment.

FIG. 20 illustrates exemplary metadata 1903. The metadata 1903 is provided in association with the collection data 1905. The metadata 1903 includes a header part and a table part.

The header part includes a field in which a connection ID is set and a field in which connection data is set. The field in which a connection data is set includes a field in which a source IP address is set, a field in which a source port number is set, a field in which a destination IP address is set, a field in which a destination port number is set, and a field in which a protocol number is set.

The header part in this example indicates that the metadata 1903 corresponds to the collection data 1905 of packets related to the connection of connection ID "CN-0001". The header part in this example indicates, for this connection, that the source is port number "2000" in a host device at IP address "10.20.30.40", and the destination is port number "20" in the host device at IP address "10.20.30.50". The header part in this example also indicates that the protocol of the fourth layer in this connection is TCP.

The table part includes a record of each packet included in the collection data 1905. The record includes a field in which a packet ID is set and a field in which an offset is set. In the table part in this example, the first packet is specified by packet ID "PC-000001" and stored from offset "0". The second packet is specified by packet ID "PC-000006" and stored from offset "624".

FIG. 21 illustrates exemplary collection data 1905. In this example, packets related to the same connection are coupled in the collection data 1905. Three packets related to connection ID "CN-0001" are coupled in the collection data 1905. The first packet starts at offset "0", and the second packet starts at offset "624".

Figure 22:
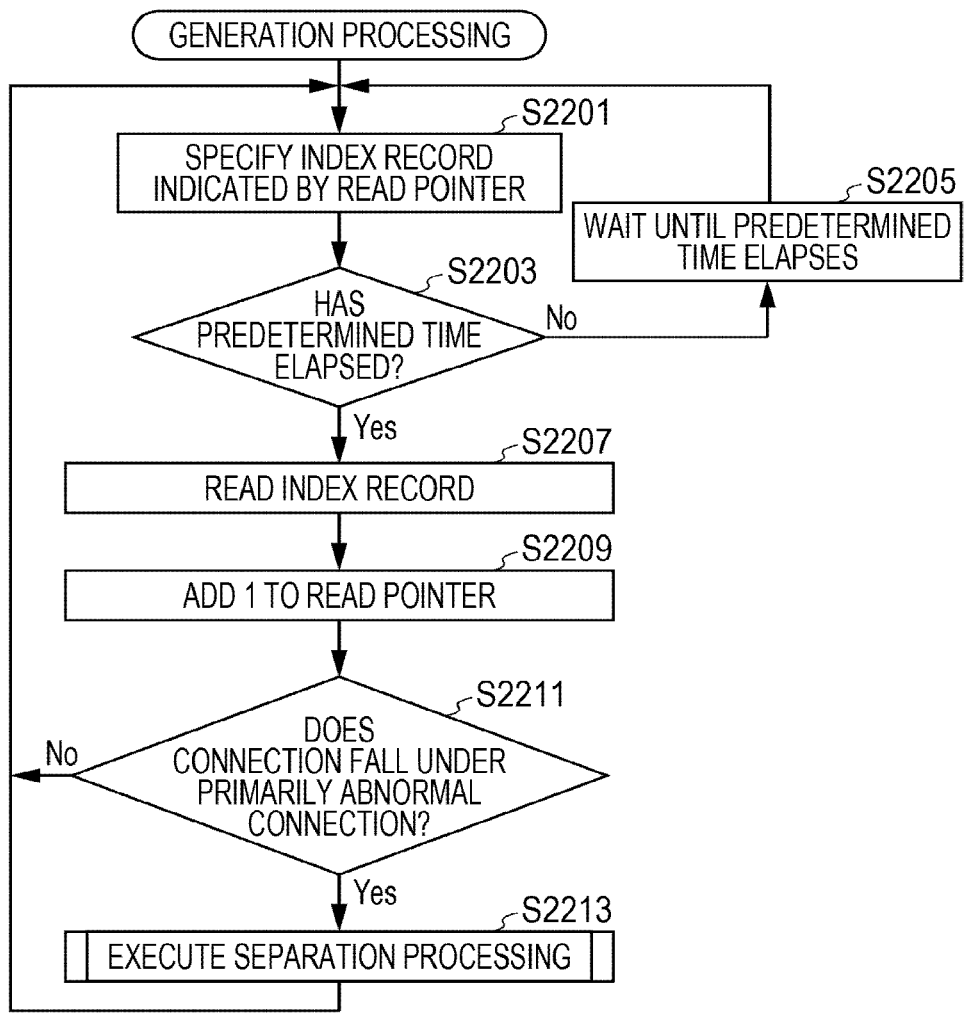
FIG. 22 is a diagram illustrating an example of an operational flowchart for generation processing, according to an embodiment.

The following describes generation processing by the generation unit 1800. FIG. 22 illustrates a process of the generation processing. The read unit 1801 specifies an index record indicated by the read pointer in the index table (S2201). The read unit 1801 determines whether the predetermined time (corresponding to the delay time) has elapsed from the reception date and time set to the index record (S2203).

When it is determined that the predetermined time has not elapsed from the reception date and time, the read unit 1801 waits for a timing when the predetermined time has elapsed from the reception date and time (S2205). Then, the process proceeds to processing at S2201 at this timing.

When it is determined that the predetermined time has elapsed from the reception date and time, the read unit 1801 reads an index record (S2207), and adds one to the read pointer (S2209). When the read pointer is indicating the last record number, the read unit 1801 returns the read pointer back to the first record number.

The separation unit 1805 determines whether a connection ID set to the index record falls under a primarily abnormal connection (S2211). Specifically, when this connection ID matches the ID of any primarily abnormal connection set in the primary abnormality table, the separation unit 1805 determines that the connection ID falls under a primarily abnormal connection.

When it is determined that this connection ID does not fall under a primarily abnormal connection, the process returns to processing at S2201 and repeats the processing described above.

When it is determined that this connection ID falls under a primarily abnormal connection, the separation unit 1805 executes separation processing (S2213).

Figure 23:
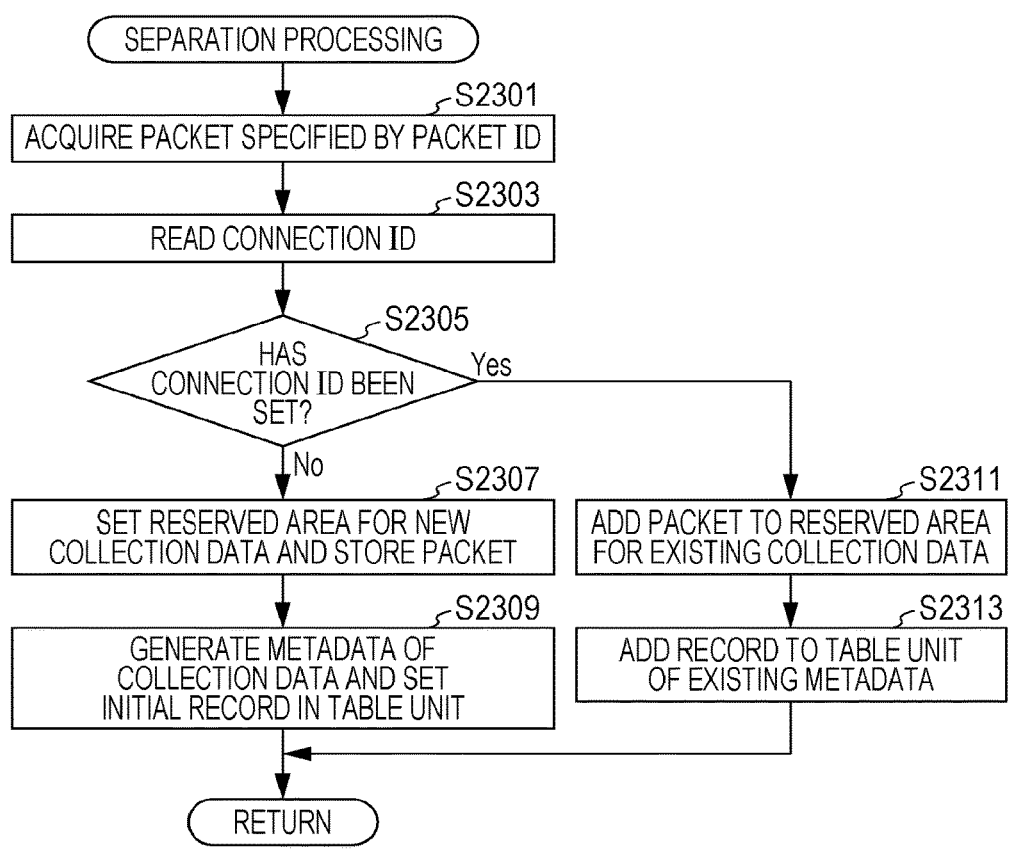
FIG. 23 is a diagram illustrating an example of an operational flowchart for separation processing, according to an embodiment.

FIG. 23 illustrates a process of the separation processing. The separation unit 1805 acquires, from the packet buffer 815, a packet specified by a packet ID set to the index record (S2301). The separation unit 1805 reads the connection ID of the index record (S2303).

The separation unit 1805 determines whether the metadata 1903 corresponding to this connection ID has been set (S2305). Specifically, the separation unit 1805 determines whether this connection ID is set to any one of the metadata 1903 stored in the object storage unit 1807.

When it is determined that the metadata 1903 corresponding to this connection ID is not set, the separation unit 1805 first sets a reserved area in the object storage unit 1807 for new collection data 1905, and stores this packet at the start of this region (S2307).

Subsequently, the separation unit 1805 generates the metadata 1903 of this collection data 1905 in the object storage unit 1807. This connection ID and connection data acquired from the connection table are set in the header part of the metadata 1903. The separation unit 1805 sets the first record in the table part of the metadata 1903 (S2309). The separation unit 1805 sets, to the record, a packet ID and an offset indicating the start of this packet. After the separation processing is completed, the process returns to the generation processing.

When it is determined that the metadata 1903 corresponding to this connection ID is set at processing at S2305, the collection data 1905 according to this connection ID and the metadata 1903 already exist. In this case, the separation unit 1805 adds the packet to a reserved area for the existing collection data 1905 (S2311). The separation unit 1805 also adds the record to the table part of the existing metadata 1903 (S2313). The separation unit 1805 sets, to the record, the packet ID and an offset indicating the start of this packet. After the separation processing is completed, the process returns to the generation processing.

Figure 24:
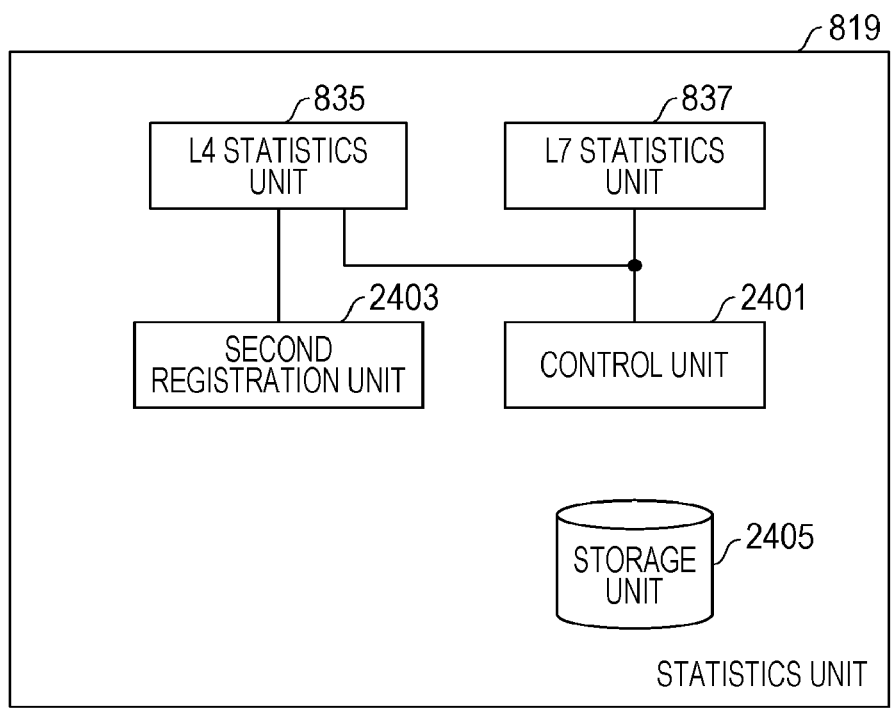
FIG. 24 is a diagram illustrating an example of a configuration of a statistics unit, according to an embodiment.

The following describes the statistics unit 819 before describing the write unit 1811. FIG. 24 illustrates an exemplary module configuration of the statistics unit 819. The statistics unit 819 includes, in addition to the L4 statistics unit 835 and the L7 statistics unit 837, a control unit 2401, a second registration unit 2403, and a storage unit 2405.

The control unit 2401 performs control of the statistics unit 819. The second registration unit 2403 registers a secondarily abnormal connection in the secondary abnormality table. The storage unit 2405 stores therein data used inside the statistics unit 819.

The control unit 2401 and the second registration unit 2403 described above are achieved by using hardware resources (for example, FIG. 28), and a computer program that causes a processor to execute the processing described below.

The storage unit 2405 described above is implemented by using hardware resources (for example, FIG. 28).

Figure 25:
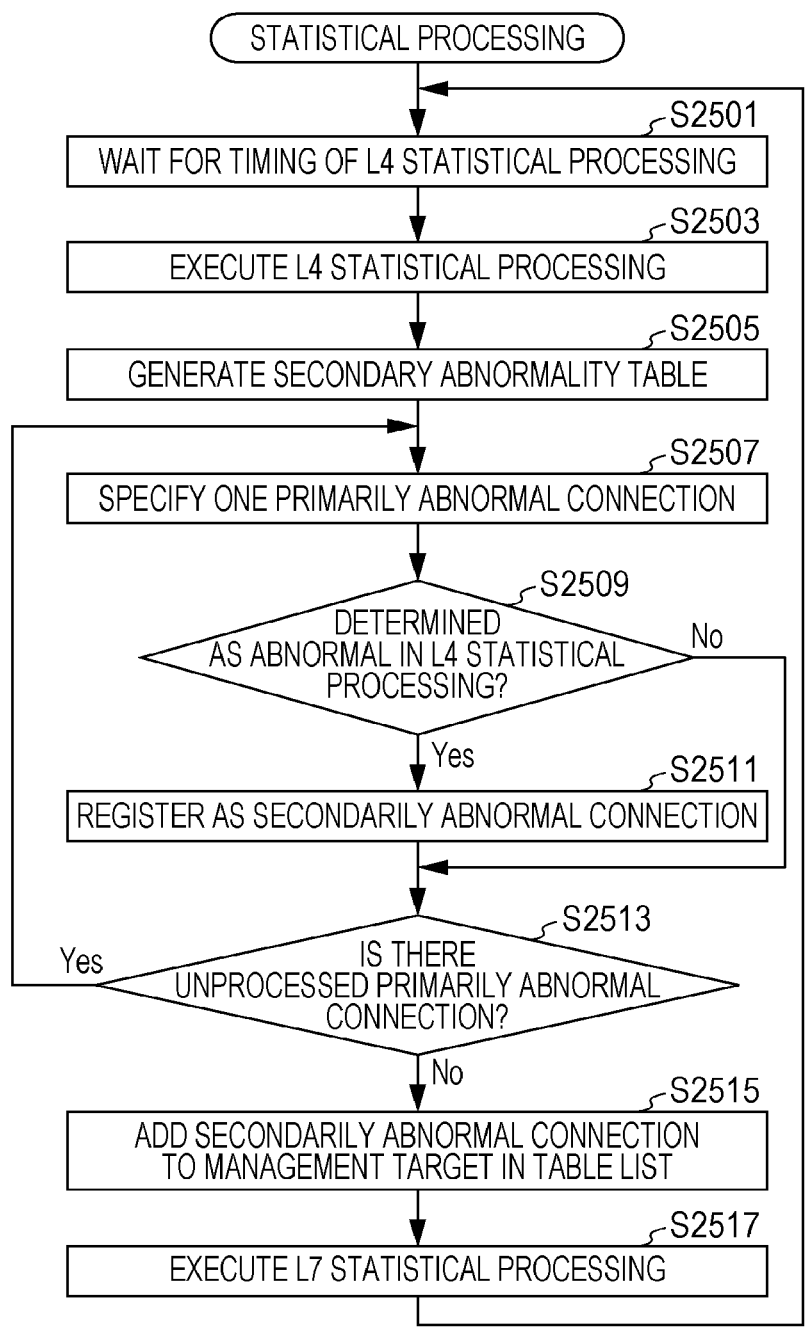
FIG. 25 is a diagram illustrating an example of an operational flowchart for statistical processing, according to an embodiment.

The following describes statistical processing by the statistics unit 819. FIG. 25 illustrates a process of the statistical processing. The control unit 2401 waits for a timing of the L4 statistical processing (S2501). In other words, the control unit 2401 waits until a time corresponding to a period has elapsed. The L4 statistics unit 835 executes the L4 statistical processing (S2503). The L4 statistical processing diagnoses a network state based on statistical values such as the number of transmitted and received packets, the number of bytes, the number of packet losses, and RTTs, and the like by using, as samples, packets captured after the L4 statistical processing is performed last. A result of analysis on each packet is obtained from the L4 analysis unit 831. In the L4 statistical processing, the result of analysis on each packet is statistically processed to perform abnormality determination at a higher certainty based on statistical values.

The second registration unit 2403 generates the secondary abnormality table corresponding to this period (S2505). As described above, the secondary abnormality table is provided for each period.

The second registration unit 2403 specifies one of primarily abnormal connections set in the primary abnormality table (S2507). When no primarily abnormal connection is set in the primary abnormality table, the process proceeds to processing at S2515.

The second registration unit 2403 bifurcates processing depending on whether this primarily abnormal connection is determined to be abnormal in the L4 statistical processing (S2509). When this primarily abnormal connection is not determined to be abnormal in the L4 statistical processing, the process proceeds to processing at S2513.

When this primarily abnormal connection is also determined to be abnormal in the L4 statistical processing, the second registration unit 2403 registers this primarily abnormal connection in the secondary abnormality table as a secondarily abnormal connection (S2511).

The second registration unit 2403 determines whether there is an unprocessed primarily abnormal connection (S2513). When it is determined that there is an unprocessed primarily abnormal connection, the process returns to processing at S2507, and repeats the processing described above.

When it is determined that there is no unprocessed primarily abnormal connection, the second registration unit 2403 adds the secondary abnormality table to a management target in the table list (S2515). Specifically, the second registration unit 2403 sets the date and time of the L4 statistical processing and the address of the secondary abnormality table to a new record in the table list. The date and time of the L4 statistical processing specifies a period. Alternatively, the period may be specified by a period number in place of the date and time of the L4 statistical processing.

The L7 statistics unit 837 executes L7 statistical processing (S2517). The L7 statistical processing is the same as the conventional processing, and thus description thereof will be omitted. Then, the process returns to processing at S2501. This ends description of the statistical processing.

Figure 26:
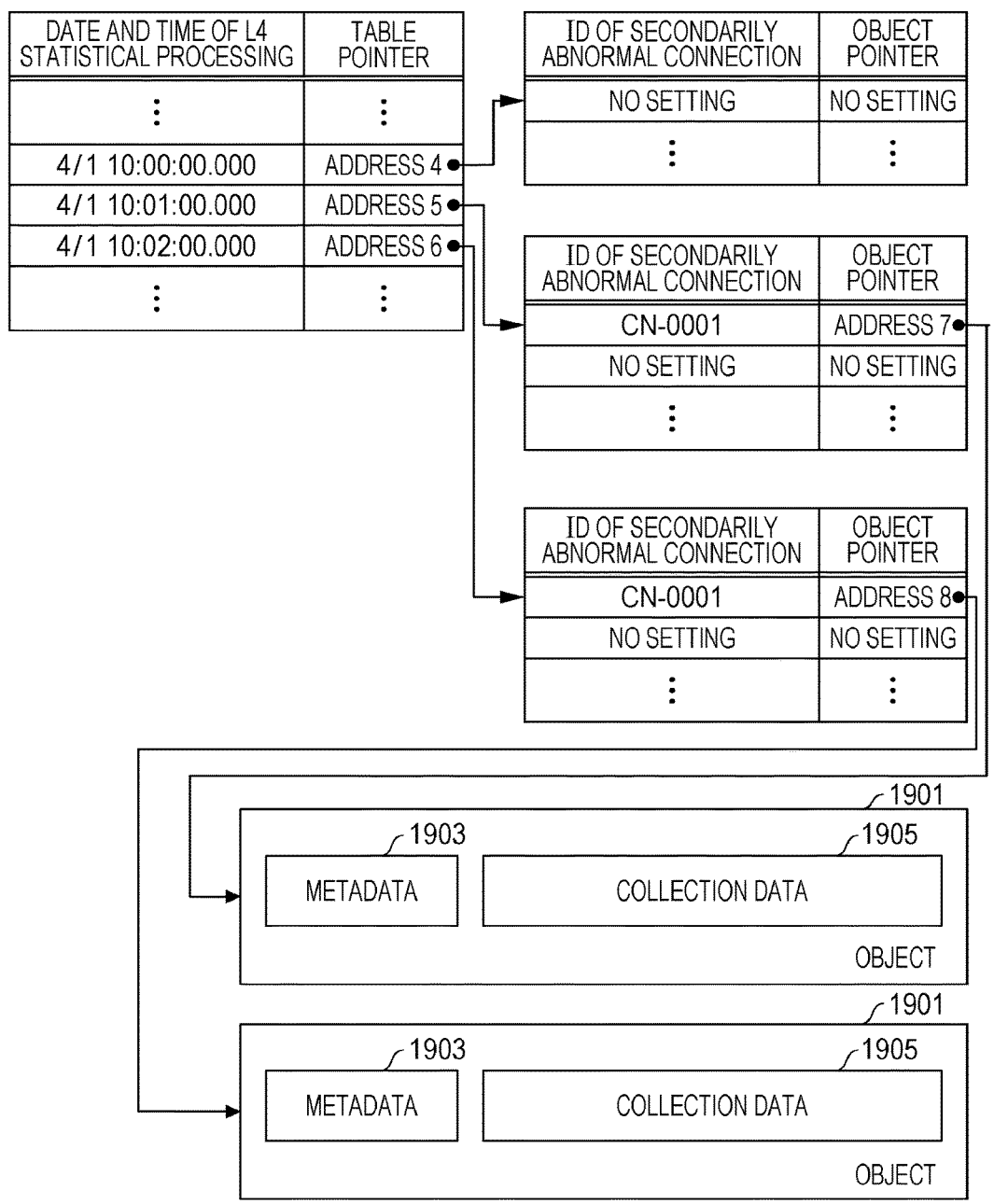
FIG. 26 is a diagram illustrating an example of retained data, according to an embodiment.

The following describes the write unit 1811. FIG. 26 illustrates exemplary retained data written by the write unit 1811. The retained data includes the table list and the secondary abnormality table exemplarily illustrated in FIG. 12. However, the table pointer is written over in some cases. The secondary abnormality table additionally includes a field for an object pointer for specifying the storage location of the object 1901 of the secondarily abnormal connection. As illustrated, the retained data also includes the object 1901 related to the secondarily abnormal connection in each period.

Figure 27A:
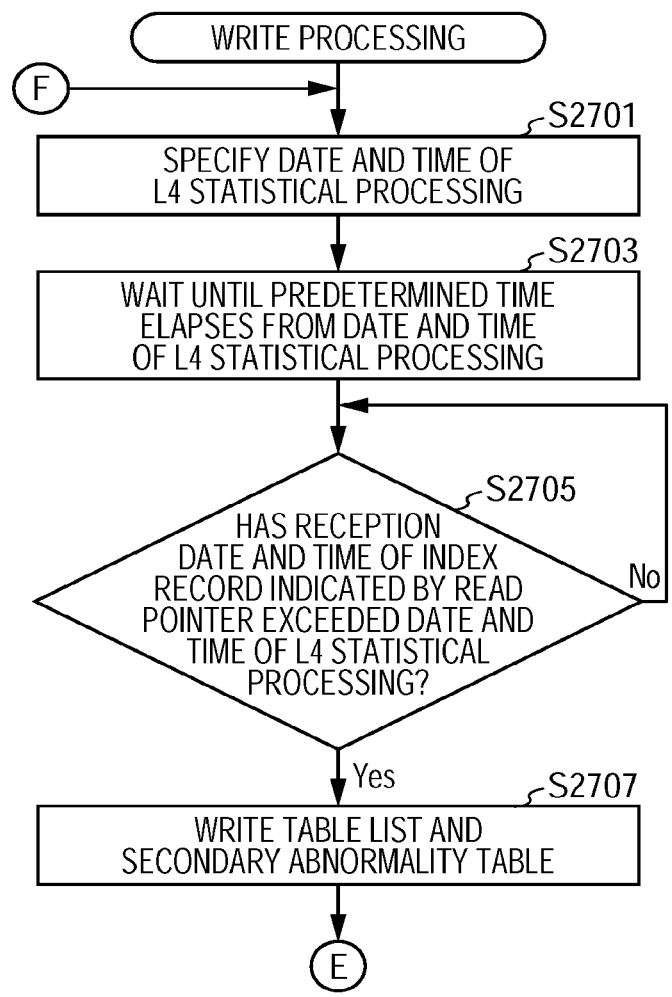
FIG. 27A is a diagram illustrating an example of an operational flowchart for write processing, according to an embodiment.
Figure 27B:
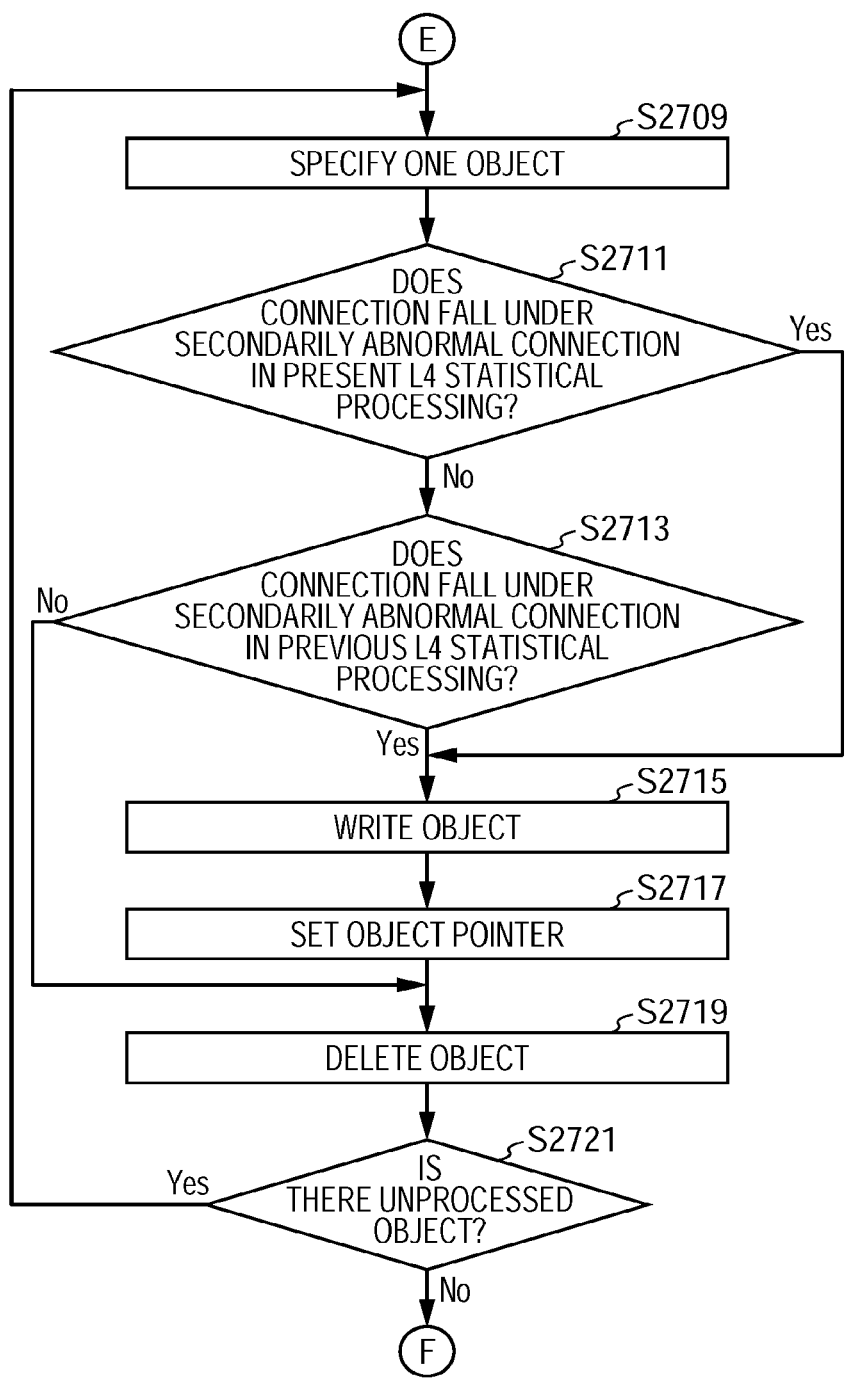
FIG. 27B is a diagram illustrating an example of an operational flowchart for write processing, according to an embodiment.

FIGS. 27A and 27B illustrate a process of write processing. The write unit 1811 specifies the date and time of the L4 statistical processing yet to be a specification target. Specifically, the write unit 1811 specifies the date and time of the L4 statistical processing performed between the predetermined time (corresponding to the delay time) before and the present (S2701).

Then, the write unit 1811 waits until the predetermined time has elapsed from the date and time of the L4 statistical processing (S2703).

When the predetermined time has elapsed from the date and time of the L4 statistical processing, the write unit 1811 further determines whether a reception date and time set to an index record indicated by the read pointer in the index table has exceeded the date and time of the L4 statistical processing (S2705).

When it is determined that this reception date and time has not exceeded the date and time of the L4 statistical processing, the process repeats processing at S2705.

When it is determined that this reception date and time has exceeded the date and time of the L4 statistical processing, the write unit 1811 writes the table list and the secondary abnormality table stored in the object storage unit 1807 to the retained data storage unit 843 (S2707). The write unit 1811 may write updated content only.

The process proceeds to processing at S2709 in FIG. 27B through link E. The write unit 1811 specifies one object 1901 stored in the object storage unit 1807 (S2709).

The write unit 1811 determines whether the connection of the specified object 1901 falls under a secondarily abnormal connection in the present L4 statistical processing (S2711). Specifically, when a connection ID set in the header of the metadata 1903 of this object 1901 matches the ID of any secondarily abnormal connection in the latest secondary abnormality table, the write unit 1811 determines that the connection of the specified object 1901 falls under a secondarily abnormal connection in the present L4 statistical processing.

When it is determined that the connection of the object 1901 specified at S2709 falls under a secondarily abnormal connection in the present L4 statistical processing, the process proceeds to processing at S2715.

When it is determined that the connection of the object 1901 specified at S2709 does not fall under a secondarily abnormal connection in the present L4 statistical processing, the write unit 1811 further determines whether this connection falls under a secondarily abnormal connection in the previous L4 statistical processing (S2713). Specifically, when a connection ID set in the header of the metadata 1903 of this object 1901 matches the ID of any secondarily abnormal connection in a secondary abnormality table right before the latest secondary abnormality table, the write unit 1811 determines that the connection of the specified object 1901 falls under a secondarily abnormal connection in the previous L4 statistical processing.

When it is determined that the connection of the object 1901 specified at S2709 falls under a secondarily abnormal connection in the previous L4 statistical processing, the process proceeds to processing at S2715. When it is determined that the connection of the object 1901 specified at S2709 does not fall under a secondarily abnormal connection in the previous L4 statistical processing, the process proceeds to processing at S2719.

At S2715, the write unit 1811 writes this object 1901 in the retained data storage unit 843. The write unit 1811 sets a pointer to the written object 1901 to a record of the secondarily abnormal connection in the corresponding (latest or previous) secondary abnormality table (S2717).

At S2719, the write unit 1811 deletes this object 1901 stored in the object storage unit 1807.

The write unit 1811 determines whether there is an unprocessed object 1901 (S2721). When it is determined that there is an unprocessed object 1901, the process returns to processing at S2709 and repeats the processing described above. When it is determined that there is no unprocessed object 1901, the process return to processing at S2701 in FIG. 27A through link F and performs processing in the next period.

Such writing the object 1901 of a secondarily abnormal connection in the previous L4 statistical processing enables collection of any packet in a period in which a secondary abnormality is detected last even when the secondary abnormality is resolved in the middle of the process. However, the object 1901 of the secondarily abnormal connection in the previous L4 statistical processing may not to be written.

The embodiment allows for collection of a packet related to an abnormal connection by using a smaller amount of resources.

Since the object 1901 is temporarily generated in the object storage unit 1807, the packet buffer 815 only has to have a small capacity.

Since the object 1901 that is no longer used is deleted, the object storage unit 1807 only has to have a small capacity.

Since the object 1901 of a connection to which no secondary abnormality is occurring is not stored, the retained data storage unit 843 only has to have a small capacity.

In addition, the load generated on processing such as writing, reading, and deleting of data is small.

The above describes the embodiment of the present disclosure, but the present disclosure is not limited thereto. For example, the above-described functional block configuration may not to be identical to a program module configuration.

The configuration of each storage region described above is merely exemplary, and the storage region may have other configurations. In addition, in a process of processing, a plurality of pieces of processing may be executed in a different order or in parallel without changing a processing result.

The network monitoring device 801 described above is a computer device including, as illustrated in FIG. 28, a memory 2501, a central processing unit (CPU) 2503, a hard disk drive (HDD) 2505, a display control unit 2507 connected with a display unit 2509, a drive unit 2513 for a removable disk 2511, an input device 2515, and a communication control unit 2517 configured to be coupled to a network, which are coupled to each other through a bus 2519. The HDD 2505 stores therein an operating system (OS) and an application program for performing the processing according to the embodiment, which are read onto the memory 2501 from the HDD 2505 to be executed by the CPU 2503. The CPU 2503 controls the display control unit 2507, the communication control unit 2517, and the drive unit 2513 in accordance with processing content of the application program, so as to perform a predetermined operation. Data being processed is mainly stored in the memory 2501, but may be stored in the HDD 2505. In the embodiment of the present disclosure, the application program for performing the processing described above is stored and distributed in the computer-readable removable disk 2511, and installed in the HDD 2505 through the drive unit 2513. The application program may be installed in the HDD 2505 through a network such as the Internet and the communication control unit 2517. Using such a computer device, various functions described above are implemented organically through cooperation of the above-described hardware including the CPU 2503 and the memory 2501, and programs such as the OS and the application program.

The above-described embodiment of the present disclosure is summarized as follows.

A packet collection method according to the embodiment includes: (A) allocating a first identifier to each of packets captured from a network and storing the packet in a buffer; (B) associating the first identifier with a second identifier specifying a connection of the packet related to the first identifier; (C) detecting a connection to which a primary abnormality is occurring by analyzing the packet stored in the buffer; (D) storing, for each connection to which the primary abnormality has occurred, a group including the packet to which the first identifier associated with the second identifier of this connection is allocated, in a first storage region; (E) detecting a connection to which a secondary abnormality is occurring based on a statistical value related to a result of analysis on the packet captured in a sampling duration; and (F) writing a group related to the connection to which the secondary abnormality has occurred among the groups stored in the first storage region, in a second storage region.

In this manner, it is possible to collect a packet related to an abnormal connection by using a smaller amount of resources.

The packet collection method may further include deleting, from the first storage region, the group related to the connection to which the secondary abnormality has occurred and a group related to a connection to which no secondary abnormality has occurred.

In this manner, the first storage region only has to have a small capacity.

It is possible to produce a computer program configured to cause a computer to execute the processing by the above-described method. This computer program may be stored in, for example, a computer-readable storage medium or storage device such as a flexible disk, a CD-ROM, a magneto optical disk, a semiconductor memory, or a hard disk. Typically, a processing result being processed is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method performed by a computer, the method comprising:
    allocating a packet identifier to each of packets captured from a network, and storing the each packet in a buffer;
    associating, with each of the packet identifiers, a connection identifier specifying a connection for a packet identified by the each packet identifier;
    detecting a connection to which a primary abnormality is occurring by analyzing packets stored in the buffer;
    storing, for each of connections to which the primary abnormality has occurred, a primary-abnormality group of packets to which the packet identifiers associated with the connection identifier of the each connection are allocated, in a first storage region;
    detecting a connection to which a secondary abnormality is occurring, based on a statistical value related to results of analyses on packets captured in a sampling duration; and
    writing, in a second storage region, secondary-abnormality groups of packets related to connections to which the secondary abnormality has occurred, among the primary-abnormality groups of packets stored in the first storage region.

2. The method of claim 1, further comprising
    deleting, from the first storage region, the secondary-abnormality groups of packets and groups of packets related to connections to which no secondary abnormality has occurred.

3. The method of claim 1, wherein
    the primary abnormality is an abnormality detected before detection of the secondary abnormality in an identical connection.

4. A non-transitory, computer-readable recording medium having stored therein a program for causing a computer to execute a process comprising:
    allocating a packet identifier to each of packets captured from a network, and storing the each packet in a buffer;
    associating, with each of the packet identifiers, a connection identifier specifying a connection for a packet identified by the each packet identifier;
    detecting a connection to which a primary abnormality is occurring by analyzing packets stored in the buffer;
    storing, for each of connections to which the primary abnormality has occurred, a primary-abnormality group of packets to which the packet identifiers associated with the connection identifier of the each connection are allocated, in a first storage region;
    detecting a connection to which a secondary abnormality is occurring, based on a statistical value related to results of analyses on packets captured in a sampling duration; and
    writing, in a second storage region, secondary-abnormality groups of packets related to connections to which the secondary abnormality has occurred, among the primary-abnormality groups of packets stored in the first storage region.

5. An apparatus comprising:
    a memory including a buffer, a first storage region, and a second storage region; and
    a processor coupled to the memory and configured to:
        allocate a packet identifier to each of packets captured from a network, and store the each packet in the buffer,
        associate, with each of the packet identifiers, a connection identifier specifying a connection for a packet identified by the each packet identifier,
        detect a connection to which a primary abnormality is occurring by analyzing packets stored in the buffer,
        store, for each of connections to which the primary abnormality has occurred, a primary-abnormality group of packets to which the packet identifiers associated with the connection identifier of the each connection are allocated, in the first storage region,
        detect a connection to which a secondary abnormality is occurring, based on a statistical value related to results of analyses on packets captured in a sampling duration, and
        write, in the second storage region, secondary-abnormality groups of packets related to connections to which the secondary abnormality has occurred, among the primary-abnormality groups stored in the first storage region.

* * * * *